United States Patent
Plotnick et al.

(10) Patent No.: US 9,165,604 B2
(45) Date of Patent: Oct. 20, 2015

(54) ALTERNATIVE ADVERTISING IN PRERECORDED MEDIA

(71) Applicant: Prime Research Alliance E., Inc., Road Town, Tortola (VG)

(72) Inventors: Michael A. Plotnick, Southampton, PA (US); Robert F. Deitrich, Slippery Rock, PA (US); Charles A. Eldering, Doylestown, PA (US); Douglas J. Ryder, Doylestown, PA (US); Herbert M. Lustig, Falls Church, VA (US)

(73) Assignee: PRIME RESEARCH ALLIANCE E, INC.

( * ) Notice: Subject to any disclaimer, the term of this patent is extended or adjusted under 35 U.S.C. 154(b) by 0 days.

(21) Appl. No.: 14/488,005

(22) Filed: Sep. 16, 2014

(65) Prior Publication Data

US 2015/0003810 A1  Jan. 1, 2015

Related U.S. Application Data

(63) Continuation of application No. 13/612,973, filed on Sep. 13, 2012, now Pat. No. 8,837,920, which is a continuation of application No. 10/006,874, filed on Nov. 14, 2001, now Pat. No. 8,290,351.

(60) Provisional application No. 60/329,992, filed on Oct. 17, 2001, provisional application No. 60/281,037, filed on Apr. 3, 2001.

(51) Int. Cl.
  *H04N 21/2668* (2011.01)
  *G11B 27/036* (2006.01)
  (Continued)

(52) U.S. Cl.
  CPC ............ *G11B 27/036* (2013.01); *G11B 27/005* (2013.01); *H04N 5/445* (2013.01);
  (Continued)

(58) Field of Classification Search
  CPC ............ H04N 21/812; H04N 21/6527; H04N 21/2668; H04N 5/783; G06Q 30/0272; G06Q 30/0241
  See application file for complete search history.

(56) References Cited

U.S. PATENT DOCUMENTS

| 4,845,564 A | 7/1989 | Hakamada et al. |
| 4,930,158 A | 5/1990 | Vogel |

(Continued)

FOREIGN PATENT DOCUMENTS

| WO | WO9848566 | 1/1999 |
| WO | WO9926415 | 5/1999 |

(Continued)

OTHER PUBLICATIONS

U.S. Appl. No. 09/591,577, Eldering, Charles A., filed Jun. 9, 2000.

(Continued)

*Primary Examiner* — Huy T Nguyen

(74) *Attorney, Agent, or Firm* — The Belles Group, P.C.

(57) ABSTRACT

Presenting viewers with an alternative brief version of a recorded advertisement when they choose to fast-forward through or skip (or any other trick play event) the recorded advertisement. The alternative advertisement may be displayed instead of or in conjunction with the recorded advertisement (i.e., fast-forwarding advertisement is displayed in one portion of the screen (i.e., background or portion of a split screen) and the alternative brief version is displayed in another portion). The alternative brief version of the advertisement (trick play advertisement) may be a marketing message that is a static screen presenting a logo or a portion of the recorded advertisement, or may be a condensed version of the actual advertisement. The trick play advertisements may be targeted. An alternate or entirely unrelated advertisement can also be displayed as the trick play advertisement.

20 Claims, 25 Drawing Sheets

(51) Int. Cl.

| | | |
|---|---|---|
| *G11B 27/00* | (2006.01) | |
| *H04N 5/445* | (2011.01) | |
| *H04N 5/76* | (2006.01) | |
| *H04N 7/173* | (2011.01) | |
| *H04N 21/2343* | (2011.01) | |
| *H04N 21/25* | (2011.01) | |
| *H04N 21/2543* | (2011.01) | |
| *H04N 21/2747* | (2011.01) | |
| *H04N 21/4147* | (2011.01) | |
| *H04N 21/431* | (2011.01) | |
| *H04N 21/433* | (2011.01) | |
| *H04N 21/4402* | (2011.01) | |
| *H04N 21/45* | (2011.01) | |
| *H04N 21/458* | (2011.01) | |
| *H04N 21/472* | (2011.01) | |
| *H04N 21/60* | (2011.01) | |
| *H04N 21/81* | (2011.01) | |
| *H04N 21/858* | (2011.01) | |
| *H04N 9/87* | (2006.01) | |
| *H04N 5/781* | (2006.01) | |
| *H04N 5/783* | (2006.01) | |
| *H04N 5/85* | (2006.01) | |
| *H04N 9/804* | (2006.01) | |
| *H04N 21/478* | (2011.01) | |

(52) U.S. Cl.
CPC ............ *H04N 5/76* (2013.01); *H04N 7/17318* (2013.01); *H04N 9/87* (2013.01); *H04N 21/234381* (2013.01); *H04N 21/252* (2013.01); *H04N 21/25435* (2013.01); *H04N 21/2668* (2013.01); *H04N 21/2747* (2013.01); *H04N 21/4147* (2013.01); *H04N 21/4312* (2013.01); *H04N 21/4314* (2013.01); *H04N 21/4331* (2013.01); *H04N 21/440281* (2013.01); *H04N 21/458* (2013.01); *H04N 21/4532* (2013.01); *H04N 21/47202* (2013.01); *H04N 21/47214* (2013.01); *H04N 21/47217* (2013.01); *H04N 21/60* (2013.01); *H04N 21/812* (2013.01); *H04N 21/8586* (2013.01); *H04N 5/781* (2013.01); *H04N 5/783* (2013.01); *H04N 5/85* (2013.01); *H04N 9/8042* (2013.01); *H04N 21/478* (2013.01)

(56) References Cited

U.S. PATENT DOCUMENTS

| | | | |
|---|---|---|---|
| 5,005,099 | A | 4/1991 | Perryman |
| 5,031,044 | A | 7/1991 | Canfield et al. |
| 5,233,423 | A | 8/1993 | Jemigan et al. |
| 5,271,626 | A | 12/1993 | Llenas |
| 5,347,632 | A | 9/1994 | Filepp |
| 5,446,919 | A | 8/1995 | Wilkins |
| 5,521,631 | A | 5/1996 | Budow |
| 5,532,735 | A | 7/1996 | Blahut et al. |
| 5,535,008 | A | 7/1996 | Yamagishi et al. |
| 5,606,359 | A | 2/1997 | Youden et al. |
| 5,625,864 | A | 4/1997 | Budow |
| 5,636,346 | A | 6/1997 | Saxe |
| 5,729,649 | A | 3/1998 | Lane et al. |
| 5,732,216 | A | 3/1998 | Logan |
| 5,734,720 | A | 3/1998 | Salganicoff |
| 5,740,549 | A | 4/1998 | Reilly |
| 5,758,257 | A | 5/1998 | Herz |
| 5,774,170 | A | 6/1998 | Hite |
| 5,805,974 | A | 9/1998 | Hite |
| 5,923,627 | A | 7/1999 | Miwa |
| 5,931,901 | A | 8/1999 | Wolfe |
| 5,956,025 | A | 9/1999 | Goulden |
| 5,970,205 | A | 10/1999 | Nakamura et al. |
| 6,002,393 | A | 12/1999 | Hite |
| 6,005,561 | A | 12/1999 | Hawkins |
| 6,006,257 | A | 12/1999 | Slezak |
| 6,026,067 | A | 2/2000 | Tanaka |
| 6,029,045 | A | 2/2000 | Picco |
| 6,029,176 | A | 2/2000 | Cannon |
| 6,029,195 | A | 2/2000 | Herz |
| 6,038,591 | A | 3/2000 | Wolfe |
| 6,057,872 | A | 5/2000 | Candelore |
| 6,064,376 | A | 5/2000 | Berezowski |
| 6,070,186 | A | 5/2000 | Nishio |
| 6,100,941 | A | 8/2000 | Dimitrova |
| 6,112,186 | A | 8/2000 | Bergh |
| 6,119,098 | A | 9/2000 | Guyot |
| 6,133,912 | A | 10/2000 | Montero |
| 6,141,010 | A | 10/2000 | Hoyle |
| 6,161,142 | A | 12/2000 | Wolfe |
| 6,177,931 | B1 | 1/2001 | Alexander |
| 6,208,805 | B1 | 3/2001 | Abecassis |
| 6,216,129 | B1 | 4/2001 | Eldering |
| 6,236,395 | B1 | 5/2001 | Sezan |
| 6,289,165 | B1 | 9/2001 | Abecassis |
| 6,298,248 | B1 | 10/2001 | Miyoshi |
| 6,304,715 | B1 | 10/2001 | Abecassis |
| 6,327,418 | B1 | 12/2001 | Barton |
| 6,360,053 | B1 | 3/2002 | Wood et al. |
| 6,408,128 | B1 | 6/2002 | Abecassis |
| 6,446,261 | B1 | 9/2002 | Rosser |
| 6,456,981 | B1 | 9/2002 | Dejaeger |
| 6,457,010 | B1 | 9/2002 | Eldering |
| 6,463,585 | B1 | 10/2002 | Hendricks |
| 6,560,578 | B2 | 5/2003 | Eldering |
| 6,684,194 | B1 | 1/2004 | Eldering |
| 6,698,020 | B1 | 2/2004 | Zigmond |
| 6,714,917 | B1 | 3/2004 | Eldering |
| 6,718,551 | B1 | 4/2004 | Swix |
| 6,820,062 | B1 | 11/2004 | Gupta |
| 6,871,006 | B1 | 3/2005 | Oguz et al. |
| 6,909,837 | B1 | 6/2005 | Unger |
| 6,952,559 | B2 | 10/2005 | Bates |
| 6,973,438 | B1 | 12/2005 | Philyaw |
| 7,062,510 | B1 | 6/2006 | Eldering |
| 7,150,030 | B1 | 12/2006 | Eldering |
| 7,240,355 | B1 | 7/2007 | Eldering |
| 2001/0032333 | A1 | 10/2001 | Flickinger |
| 2001/0049620 | A1 | 12/2001 | Blasko |
| 2001/0049820 | A1 | 12/2001 | Barton |
| 2002/0042738 | A1 | 4/2002 | Srinivasan |
| 2002/0042914 | A1 | 4/2002 | Walker |
| 2002/0056107 | A1 | 5/2002 | Schlack |
| 2002/0083439 | A1 | 6/2002 | Eldering |
| 2002/0083441 | A1 | 6/2002 | Flickinger |
| 2002/0083442 | A1 | 6/2002 | Eldering |
| 2002/0083444 | A1 | 6/2002 | Blasko |
| 2002/0083445 | A1 | 6/2002 | Flickinger |
| 2002/0087402 | A1 | 7/2002 | Zystak et al. |
| 2002/0087972 | A1 | 7/2002 | Cragun |
| 2002/0092017 | A1 | 7/2002 | Klosterman |
| 2002/0123928 | A1 | 9/2002 | Eldering |
| 2002/0124249 | A1 | 9/2002 | Shintani |
| 2002/0129362 | A1 | 9/2002 | Chang et al. |
| 2002/0129368 | A1 | 9/2002 | Schlack |
| 2002/0144262 | A1 | 10/2002 | Plotnick |
| 2002/0178447 | A1 | 11/2002 | Plotnick |
| 2002/0184047 | A1 | 12/2002 | Plotnick |
| 2002/0198778 | A1 | 12/2002 | Landsman |
| 2003/0001965 | A1 | 1/2003 | Cao |
| 2003/0006911 | A1 | 1/2003 | Smith |
| 2003/0037330 | A1 | 2/2003 | Makofka |
| 2003/0066078 | A1 | 4/2003 | Bjorgan |
| 2003/0088872 | A1 | 5/2003 | Maissel |
| 2003/0093792 | A1 | 5/2003 | Labeeb |
| 2003/0149975 | A1 | 8/2003 | Eldering et al. |
| 2003/0200128 | A1 | 10/2003 | Doherty |
| 2003/0206720 | A1 | 11/2003 | Abecassis |
| 2003/0226150 | A1 | 12/2003 | Berberet |
| 2003/0228018 | A1 | 12/2003 | Vince |

(56) References Cited

U.S. PATENT DOCUMENTS

| | | |
|---|---|---|
| 2004/0133467 A1 | 7/2004 | Siler |
| 2005/0049941 A1 | 3/2005 | Kaplan |
| 2005/0097599 A1 | 5/2005 | Plotnick |

FOREIGN PATENT DOCUMENTS

| | | |
|---|---|---|
| WO | WO9955066 | 10/1999 |
| WO | WO0014951 | 6/2000 |
| WO | WO0101689 | 1/2001 |
| WO | WO0126371 | 4/2001 |
| WO | WO0147279 | 6/2001 |
| WO | WO0182163 | 11/2001 |
| WO | WO0189213 | 11/2001 |
| WO | WO0233973 | 4/2002 |
| WO | WO0233975 | 4/2002 |
| WO | WO02082374 | 10/2002 |

OTHER PUBLICATIONS

U.S. Appl. No. 09/658,204, Eldering, Charles A., et al., filed Sep. 8, 2000.

U.S. Appl. No. 09/712,790, Eldering, Charles A., filed Nov. 14, 2000.

U.S. Appl. No. 09/857,160, Eldering, Charles A., filed Dec. 2, 1999.

ALTERNATIVE ADVERTISING IN PRERECORDED MEDIA

CROSS REFERENCE TO RELATED APPLICATIONS

This application is a continuation of U.S. patent application Ser. No. 13/612,973 (Now U.S. Pat. No. 8,837,920), filed Sep. 13, 2012, entitled "Alternative Advertising in Prerecorded Media", which is a continuation of U.S. patent application Ser. No. 10/006,874 (Now U.S. Pat. No. 8,290,351), filed Nov. 14, 2001, entitled "Alternative Advertising in Prerecorded Media", which claims the benefit of U.S. Provisional Application No. 60/281,037, filed on Apr. 3, 2001 entitled Personal Video Recorder (PVR) Market Overview and Advertising Opportunities and 60/329,992, filed on Oct. 17, 2001 entitled Personal Video Recorder (PVR) System Requirements and Specification. The entire disclosure of each of these priority applications is incorporated herein by reference.

This application is related to all of the applications, patents and publications listed below. Each application listed below is herein incorporated in its entirety but is not admitted to be prior art:

U.S. application Ser. No. 09/204,888 (now U.S. Pat. No. 7,150,030), filed on Dec. 3, 1998 entitled "Subscriber Characterization System";

PCT Application PCT/US99/28528 (WIPO Publication WO 00/33160A3), filed on Dec. 2, 1999 entitled "Subscriber Characterization and Advertisement Monitoring System";

U.S. patent application Ser. No. 09/516,983 (now U.S. Pat. No. 7,240,355), filed on Mar. 1, 2000 entitled "Subscriber Characterization with Filters";

U.S. patent application Ser. No. 09/591,577 (now U.S. Pat. No. 7,949,565), filed on Jun. 9, 2000 entitled "Privacy-Protected Advertising System";

U.S. patent application Ser. No. 09/635,252, filed on Aug. 9, 2000 entitled "Subscriber Characterization Based on Electronic Program Guide Data";

U.S. application Ser. No. 09/205,653 (now U.S. Pat. No. 6,457,010), filed on Dec. 3, 1998 entitled "Client-Server Based Subscriber Characterization System";

U.S. application Ser. No. 09/205,119, filed on Dec. 3, 1998 entitled "Advertisement Monitoring System";

U.S. application Ser. No. 09/516,314, filed on Mar. 1, 2000 entitled "Advertisement Monitoring and Feedback System";

U.S. application Ser. No. 09/452,893 (now U.S. Pat. No. 6,684,194), filed on Dec. 2, 1999 entitled "Subscriber Identification System";

PCT Application PCT/US99/28600 (WIPO Publication WO 00/33233), filed on Dec. 2, 1999 entitled "Subscriber Identification System";

U.S. patent application Ser. No. 09/635,253 (now U.S. Pat. No. 6,714,917), filed on Aug. 9, 2000 entitled "Subscriber Identification Based on Electronic Program Guide Data";

U.S. patent application Ser. No. 09/553,637 (now U.S. Pat. No. 6,820,277), filed on Apr. 20, 2000 entitled "Advertising Management System for Digital Video Streams";

PCT Application PCT/US00/10633 (WIPO Publication WO 00/64165), filed on Apr. 20, 2000 entitled "Advertising Management System for Digital Video Streams";

U.S. patent application Ser. No. 09/553,099 (now U.S. Pat. No. 6,704,930), filed on Apr. 20, 2000 entitled "Advertisement Insertion Techniques for Digital Video Streams";

U.S. patent application Ser. No. 09/568,084, filed on May 10, 2000 entitled "Advertisement Subgroups for Digital Video Streams";

PCT Application PCT/US00/12710 (WIPO Publication WO 00/69163), filed on May 10, 2000 entitled "Advertisement Subgroups for Digital Video Streams";

U.S. patent application Ser. No. 09/568,477 (now U.S. Pat. No. 6,615,039), filed on May 10, 2000 entitled "Advertisement Subgroups for Digital Video Streams";

U.S. patent application Ser. No. 09/635,539, filed on Aug. 10, 2000 entitled "Delivering targeted advertisements in cable-based networks";

U.S. patent application Ser. No. 09/694,848 (now U.S. Pat. No. 7,068,724), filed on Oct. 20, 2000 entitled "Method and Apparatus for Inserting Digital Media Advertisements into Statistical Multiplexed Streams";

PCT Application PCT/US00/29034 (WIPO Publication WO 01/30086A), filed on Oct. 20, 2000 entitled "Method and Apparatus for Inserting Digital Media Advertisements into Statistical Multiplexed Streams";

U.S. patent application Ser. No. 09/796,339, filed on Feb. 28, 2001 entitled "Privacy-Protected Targeting System";

PCT Application PCT/US01/06650 (WIPO Publication WO 01/65453A1), filed on Feb. 28, 2001 entitled "Privacy-Protected Targeting System";

U.S. patent application Ser. No. 09/635,542, filed on Aug. 10, 2000 entitled "Grouping Subscribers Based on Demographic Data";

U.S. patent application Ser. No. 09/635,544, filed on Aug. 10, 2000 entitled "Transporting Ad Characterization Vectors";

U.S. patent application Ser. No. 09/712,790 (now U.S. Pat. No. 8,151,295), filed on Nov. 14, 2000 entitled "Queue Based Advertisement Scheduling and Sales";

PCT Application PCT/US01/27217, filed on Aug. 31, 2001 entitled "Targeted Advertising at the Set-Top Box";

U.S. patent application Ser. No. 09/731,606, filed on Dec. 7, 2000 entitled "System for Providing Targeted Advertisements Using Advertiser Specific Target Groups";

U.S. patent application Ser. No. 09/748,949 filed on Dec. 27, 2000 entitled "Advertisement Filtering and Storage for Targeted Advertisement Systems";

U.S. patent application Ser. No. 09/742,527 (now U.S. Pat. No. 8,180,675), filed on Dec. 21, 2000 entitled "System and Method for Automatically Managing Avail Inventory Data and Avail Pricing";

U.S. patent application Ser. No. 09/748,942 (now U.S. Pat. No. 7,328,448), filed on Dec. 27, 2000 entitled "Advertisement Distribution System for Distributing Targeted Advertisements in Television Systems";

U.S. patent application Ser. No. 09/742,506, filed on Dec. 21, 2000 entitled "Internet Based Electronic Program Guide Advertisement Insertion Method and Apparatus";

U.S. patent application Ser. No. 09/748,943, filed on Dec. 27, 2000 entitled "Delivering Targeted Advertisements to the Set-Top Box";

U.S. patent application Ser. No. 09/742,534 (now U.S. Pat. No. 7,039,932), filed on Dec. 21, 2000 entitled "Queue Based Head-End Advertisement Scheduling Method and Apparatus";

U.S. patent application Ser. No. 09/742,852, filed on Dec. 21, 2000 entitled "System for Rescheduling and Inserting Advertisements";

U.S. patent application Ser. No. 09/750,800 (now U.S. Pat. No. 7,228,555), filed on Dec. 28, 2000 entitled "System and Method for Delivering Targeted Advertisements Using Multiple Presentation Streams";

U.S. patent application Ser. No. 09/766,004 (now U.S. Pat. No. 7,185,353), filed on Jan. 19, 2001 entitled "System and Method for Delivering Statistically Scheduled Advertisements";

U.S. patent application Ser. No. 09/824,434, filed on Apr. 2, 2001 entitled "Grouping of Advertisements on an Advertising Channel in a Targeted Advertising System";

U.S. patent application Ser. No. 09/658,204. filed on Sep. 8, 2000 entitled "Targeted Advertising Through Electronic Program Guide";

U.S. Provisional Application No. 60/238,059, filed on Oct. 5, 2000 entitled "Platform Independent Addressable Television Advertising System";

U.S. Provisional Application No. 60/238,056, filed on Oct. 5, 2000 entitled "Method and System for Addressable Advertising in the Electronic Program Guide";

U.S. patent application Ser. No. 09/749,255 (now U.S. Pat. No. 7,653,923), filed on Dec. 27, 2000 entitled "Scheduling and Linking IPG Ads in Conjunction with Programming Ads in a Television Environment";

PCT Application PCT/US01/31682, filed on Oct. 5, 2001 entitled "Targeting Ads on IPG's Live Programming and Recorded Programming, and Coordinating the Ads therebetween";

U.S. patent application Ser. No. 09/680,622, filed on Oct. 6, 2000 entitled "Method and System for Addressable and Program Independent Advertising During Recorded Programs";

U.S. patent application Ser. No. 09/751,349, filed on Dec. 28, 2000 entitled "Inserting Local Signals During MPEG Channel Changes";

U.S. patent application Ser. No. 09/998,979 (now U.S. Pat. No. 7,260,823), filed on Oct. 31, 2001 entitled "Profiling and Identification of Television Viewers";

U.S. Provisional Application No. 60/267,370, filed on Feb. 8, 2001 entitled "Presentation Stream Switching Using Channel Maps";

U.S. Provisional Application No. 60/278,612, filed on Mar. 26, 2001 entitled "Formation and Utilization of Cable Microzones";

U.S. Provisional Application No. 60/281,196, filed on Apr. 3, 2001 entitled "Subscriber Selected Advertisement Display and Scheduling";

U.S. patent application Ser. No. 09/928,024, filed on Aug. 10, 2001 entitled "Targeting Ads to Subscribers based on Privacy Protected Subscriber Profiles"; and PCT Application PCT/US01/25261, filed on Aug. 10, 2001 entitled "Targeting Ads to Subscribers based on Privacy Protected Subscriber Profiles".

BACKGROUND OF THE INVENTION

The Video Cassette Recorder (VCR) is an integral part of most households. According to Statistical Abstracts of the United States, as of 1998 98.3% of US households had at least one television (the average number of television sets per home was 2.4) and 84.6% of TV households had at least one VCR. The Personal Video Recorder (PVR) is a term that is generally used to describe the digital equivalent of the VCR. PVRs are also known as Digital Video Recorders (DVRs) and when located outside of the residence can also be referred to as Personal Video Channels (PVCs).

Because VCRs are so universally accepted, it is clear that a digital successor technology will eventually take hold. That digital successor technology will provide the functionality of the VCR but with the added flexibility of a digital platform. The advent of the Internet will also have a significant impact on the successor technology to the VCR because Internet based delivery, storage and in-home distribution of multimedia content will allow for new PVR functionality and architectures.

VCRs have a fast-forward capability that allows the user to fast-forward through programming. One of the primary uses of the fast-forward button is to skip commercials in pre-recorded material. That is, users who have gone through the trouble to pre-record a program typically have no interest in viewing the advertisements. Because the use of VCRs to record programming for home use is considered "fair use" in terms of copyright, programmers and advertisers cannot prevent manufacturers from supplying VCRs or putting fast-forward functionality on VCRs, nor can they prevent consumers from using the fast-forward button to skip commercials.

PVRs, like the predecessor VCR, will have a fast-forward capability. Some manufacturers have even gone so far as to put a "commercial skip" button on the PVR that allows the user to completely skips over the advertisement with the touch of a button. Although there are copyright issues that may ultimately prevent the PVR manufacturer from including an explicit "commercial skip" button, PVR users will likely insist on the ability to fast-forward through commercials.

In a traditional VCR/PVR, the video is meaningless when the user fast-forwards or rewinds, and the audio is suppressed. The viewer cannot typically recognize the advertisement of the manufacturer, and there is therefore little chance to make an impression on the viewer. For the foregoing reasons, there is a need for a method and system for presenting a brief marketing message when a user fast-forwards through or rewinds through an advertisement.

SUMMARY OF THE INVENTION

The present invention provides a method and system for presenting viewers with an alternative brief version of an advertisement when they choose to fast-forward though a commercial. In a preferred embodiment, the viewer sees the fast-forwarded commercial in one portion of the screen (either background or portion of a split screen) while the alternative brief version is displayed. The alternative brief version of the advertisement is known as a trick play advertisement, and is a marketing message which may be a static screen presenting a logo or portion of the commercial, or may be a condensed version of the actual advertisement. An alternate or entirely unrelated advertisement can also be displayed as the trick play advertisement.

The present invention supports a wide range of formats for the presentation of the alternative advertisement including full screen alternate advertisements, opaque and transparent overlays, and split screens. A wide range of brief marketing messages can be used including brief segments of video in sequence, brief segments of video in sequences different than the original advertisement, mixed sequences of video and still images and single still images or sequences of still images.

One advantage of the present invention is that audio may accompany the alternative advertisement. The accompanying audio can be a sequence of musical notes or any other appropriate audio message such as the name of the manufacturer or a sound associated with the manufacturer or product.

Another advantage of the present invention is that if the PVR manufacturer has included a "commercial skip" feature the alternative advertisement will be presented even though the viewer has chosen to skip the commercial. The alternative advertisement can be displayed when the user rewinds through the advertisement. A number of events such as fast-forward, commercial skip, and rewind can be used to trigger the alternative advertisement and are known in general as trick-play events.

In the present invention the trick play advertisement can be formed by using segments of the full-length advertisement. In a preferred embodiment, the I-frames of the digital video sequence, which form the original advertisement, are used as the basis for still images or as beginning points for sequences of video in the trick play advertisement. In one embodiment, the trick play advertisement is formed dynamically by retrieving sections of the original advertisements. In another embodiment, a separate file is created which contains the trick play advertisement. In another embodiment the trick play advertisement is downloaded and stored separately from the original advertisement.

The present invention also supports the use of non-traditional video such as flash animation or other Internet based graphics or video. In one embodiment the trick play advertisement is comprised of stored files (local or external) that are displayed upon initiation of a trick play event.

One of the advantages of the present invention is that the trick play advertisement can be targeted such that different trick play advertisements are displayed to different market segments. These market segments may be defined by age, income, ethnicity, or other psychodemographic or socio-economic factors.

These and other features and objects of the invention will be more fully understood from the following detailed description of the preferred embodiments that should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention. In the drawings.

DETAILED DESCRIPTION OF THE INVENTION

Figure 1:
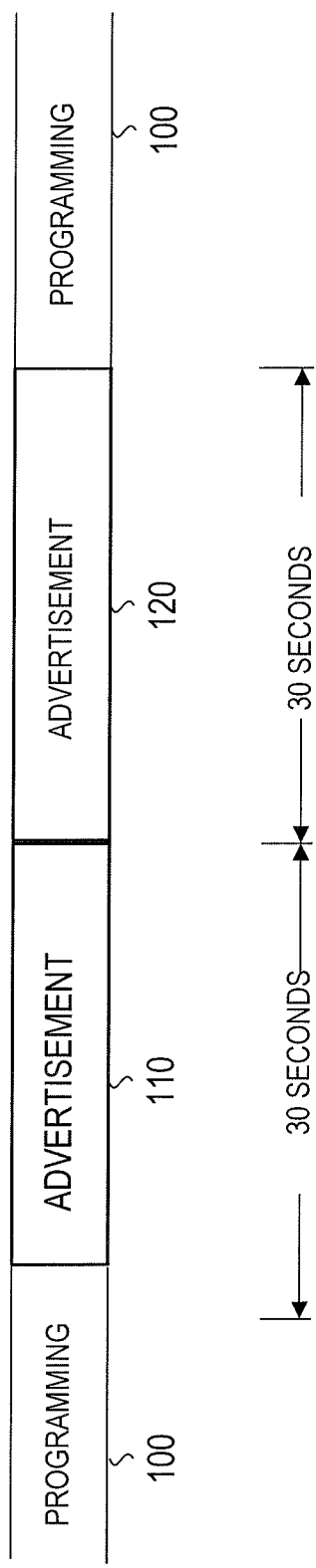
FIG. 1 illustrates an exemplary program stream having advertisements inserted within programming.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. In particular, when used herein the term alternative advertisement refers to a trick play advertisement which is the advertisement presented when a trick play event is detected. A trick play event can be defined as any event which presents an opportunity for a trick play advertisement including but not limited to initiation of fast-forward at a commercial break, a commercial skip event, or rewind.

With reference to the drawings, in general, and FIGS. 1 through 17 in particular, the apparatus of the present invention is disclosed.

FIG. 1 is an exemplary illustration of programming 100 having advertisements 110, 120 inserted in advertisement opportunities (avails) within the programming 100. The programming may be video, audio, streaming media or other programming that would be obvious to one of ordinary skill in the art. For ease, throughout the application we will focus of the video programming and in particular digital video. However, the invention is in no way intended to be limited thereby.

As illustrated, two 30-second advertisements 110, 120 are inserted in the middle of the programming 100. However, the invention is in no way intended to be limited to this exemplary embodiment. As one skilled in the art would recognize the advertisements may be any length (i.e., 15, 30, 45, 60 seconds), there may be any number of advertisements (i.e., 3, 4, 5 advertisements during a commercial break), the advertisements may be inserted at any point in the programming (i.e., pre-pended or post-pended), and may be inserted between different programs. When one normally talks about advertisements in programming they are referring to broadcast or network programming, such as ABC, NBC, ESPN. However, advertisements may also be associated with Video on Demand (VoD) programming, Pay Per View (PPV) programming, pre-recorded programming that may be stored on cassettes, CDs, DVDs or other media, streaming media programming and other programming that is either now known or later discovered. For ease, throughout the application we will focus on the programming delivered to a subscriber (i.e., broadcast, network, VoD, PPV). However, the invention is in no way intended to be limited thereby.

The broadcast, network, VoD and PPV programming may be transmitted to a subscriber via a programming delivery network. The video delivery network may be a digital broadcast satellite (DBS) system, a cable television (CATV) system, a Switched Digital Video System (SDV), Internet, or other systems now known or later discovered. The system architectures can include Hybrid Fiber Coax (HFC), Fiber to the Curb (FTTC), Fiber to the Home (FTTH), any iteration of Digital Subscriber Loop (xDSL) including very high speed DSL (VDSL), terrestrial wireless networks such as multi-channel multipoint distribution systems (MMDS) or local MDS (LMDS), or other architectures now know or later discovered system.

Figure 2:
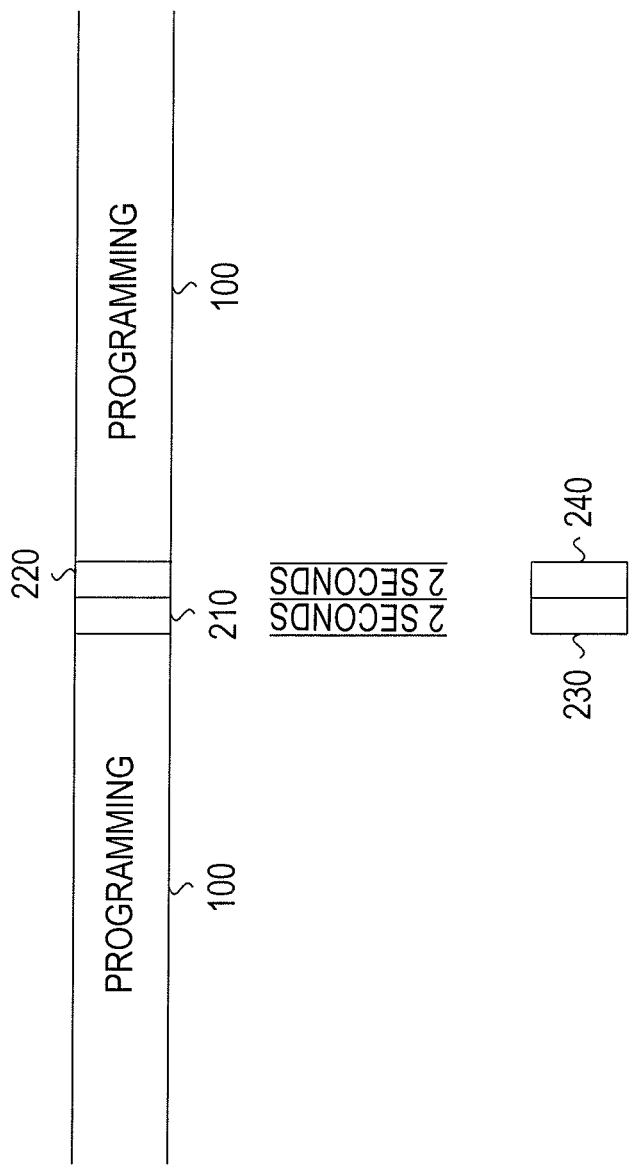
FIG. 2 illustrates an exemplary embodiment of the advertisements of FIG. 1 being fast-forwarded and alternative advertisements being available in place of or in conjunction with the fast-forwarding advertisements.

As one of ordinary skill in the art would recognize, if the programming is recorded for future playback, there is the potential that subscribers may fast forward through, or skip advertisements. With the advent of the personal video recorder (PVR) in any of its various forms that will be discussed in detail below, it is possible for the subscriber to record the programming and play it back in the future (potentially just a few minutes later) and fast forward through, or skip the advertisements. FIG. 2 illustrates an exemplary fast forward event taking place during the viewing of the advertisements. As illustrated, each of the 30 second advertisements 110, 120 illustrated in FIG. 1 have been reduced to two second fast forwarded advertisements 210, 220. As one of ordinary skill in the art would recognize, a two second fast forwarded advertisement 210, 220 will not convey the advertiser's message to the subscriber. In this exemplary illustration the two second fast forwarding recorded advertisements 210, 220 are based on the subscriber fast forwarding the advertisement at 15 times the normal speed (i.e., 15×). It should be obvious to one of ordinary skill in the art, there are numerous other fast forward speeds that would be well within the scope of the invention and that the invention is in no way intended to be limited by the 15× example.

Advertisers pay very significant sums of money for advertisements placed in broadcast and network programming and in fact, advertising subsidizes free broadcast and network programming. Advertisers therefore want assurances that their advertisements are actually displayed to subscribers and are not simply skipped over. It is unlikely that subscribers can be prevented from fast forwarding over the advertisements, thus there is a need for ensuring that the advertisers get some value for their advertisements, even if the subscriber fast forwards through the advertisements. The current invention replaces or supplements the fast forwarding advertisements 210, 220 with alternative advertisements (also called trick-play advertisements) 230, 240. The alternative advertisements 230, 240 are designed to get the advertiser's message across in the same amount of time it takes the subscriber to fast forward through the recorded advertisement (i.e., 2 seconds in the exemplary embodiment of FIG. 2). In alternative embodiments this technology is also applied to skipping, rewinding, pausing and any other function that effects the presentation of the advertisement (often referred to in the industry as "trick-play"). In another alternative embodiment, the alternative advertisement is not related to the advertisement being fast forwarded (or rewinded or paused). In this embodiment, the alternative ads could be purchased separately and have no connections to the ad (i.e., next in queue) or could be tied to the ad in some fashion (i.e., Coke displaying an alternative ad during a fast forwarding Pepsi advertisement).

For ease of understanding the current invention will be described in relation to the recording and playback of advertisements utilizing a PVR. However, the invention is in no way intended to be limited solely to PVRs. Before describing the generation or contents of the alternative advertisement in detail, a detailed description of multiple variations of a PVR will first be described.

PVR Introduction

The PVR is a device that enables a television or other interactive media viewer the ability to digitally store programming for subsequent viewing. PVRs may also be referred to as Digital Video Recorders (DVRs) and in some instances (in particular head-end based PVRs) are referred to as Personal Video Channels (PVCs). When used herein the term PVR refers to any type of device which digitally stores and plays back programming, and can include devices located in the residence, the head-end or central office, in the distribution network, as part of the Internet, or distributed over any or all of these locations.

Streaming media may begin to change the way video is viewed in the home and new Internet based interfaces for television viewing may appear. These advances will facilitate PVRs and may result in new types of PVR based systems which are essentially Internet based networks in which information is stored and managed in a distributed manner between the content provider, service provider, and viewer.

PVR Functionality

The PVR provides the basic functions of a VCR including record, play, rewind and fast forward. The PVR also includes functions that give a viewer the ability to manipulate live television programs by recording them simultaneously as they are being watched. This allows the viewer the ability to "pause" and have the program be recorded automatically (without hitting a Record button) and then resume watching the program by hitting Play. PVRs used to watch live programming allow the viewer to fast forward up to the current time, such that if pause was hit the viewer can return to the programming and advance through what was stored during the pause. Fast forward speeds typically include 5×, 20×, and 60×, but are clearly not limited thereto. PVRs can also offer the ability to convert live program to a recording ("Convert to Recording" feature) the ability to return to live viewing ("Resume Live TV" feature) and the ability to clear the recording buffer upon a channel change.

Regardless of how a program was recorded on the PVR, during playback the PVR offers the viewer the ability to play, stop, pause, rewind, and fast forward through the recorded program. In addition, the digital PVR can support frame forward and frame backward features as well as digital slow motion, bookmark, and "go to time" features. An additional, and controversial, feature is the "Skip Forward" or "Commercial Skip" function, which some commercially available devices offer. Theses functions allow a user to skip forward exactly 30 seconds, effectively allowing the viewer to skip through commercials without seeing any portion of the advertisement or having to search for the return to programming. Clearly this feature will greatly reduce the effectiveness of television advertising, and could potentially eliminate traditional advertising entirely. Nevertheless, television advertising is currently a $53B market in the US today and will not be eliminated overnight. A variety of advertising techniques are likely to be used based both on traditional 30-second spots as well as on novel advertising methodologies that will deliver the message to the viewer even though they have the ability to quickly skip through advertisements.

The manual recording features on a PVR are similar to those on a VCR, but PVRs also include advanced features such as the ability to check for schedule conflict and to set recording quality, priority, and expiration (the point in time at which the program is deleted from storage). Program guides, often referred to as Electronic or Interactive Program Guides (EPGs/IPGs), will generally be available on PVRs and are a key feature in that they allow the user to find programs that they wish to watch or record, as well as providing ancillary information about the programs. The program guide information can also include metadata about the programs that enables the autonomous recording of programs based on a user profile.

Automatic program guide based recording can be used to record or repeatedly record a program. Some PVRs provide for intelligent recording in that they will automatically record programs based on a user having recorded or watched that program previously. Some systems also attempt to "learn" what the user likes to watch and will record those programs as well as similar programming. An example of a system which learns user preferences for future recording is described in World Intellectual Property Organization (WIPO) publication WO 99/65237 entitled "Television programming recording with user preference determination," published on Dec. 16, 1999.

Figure 3:
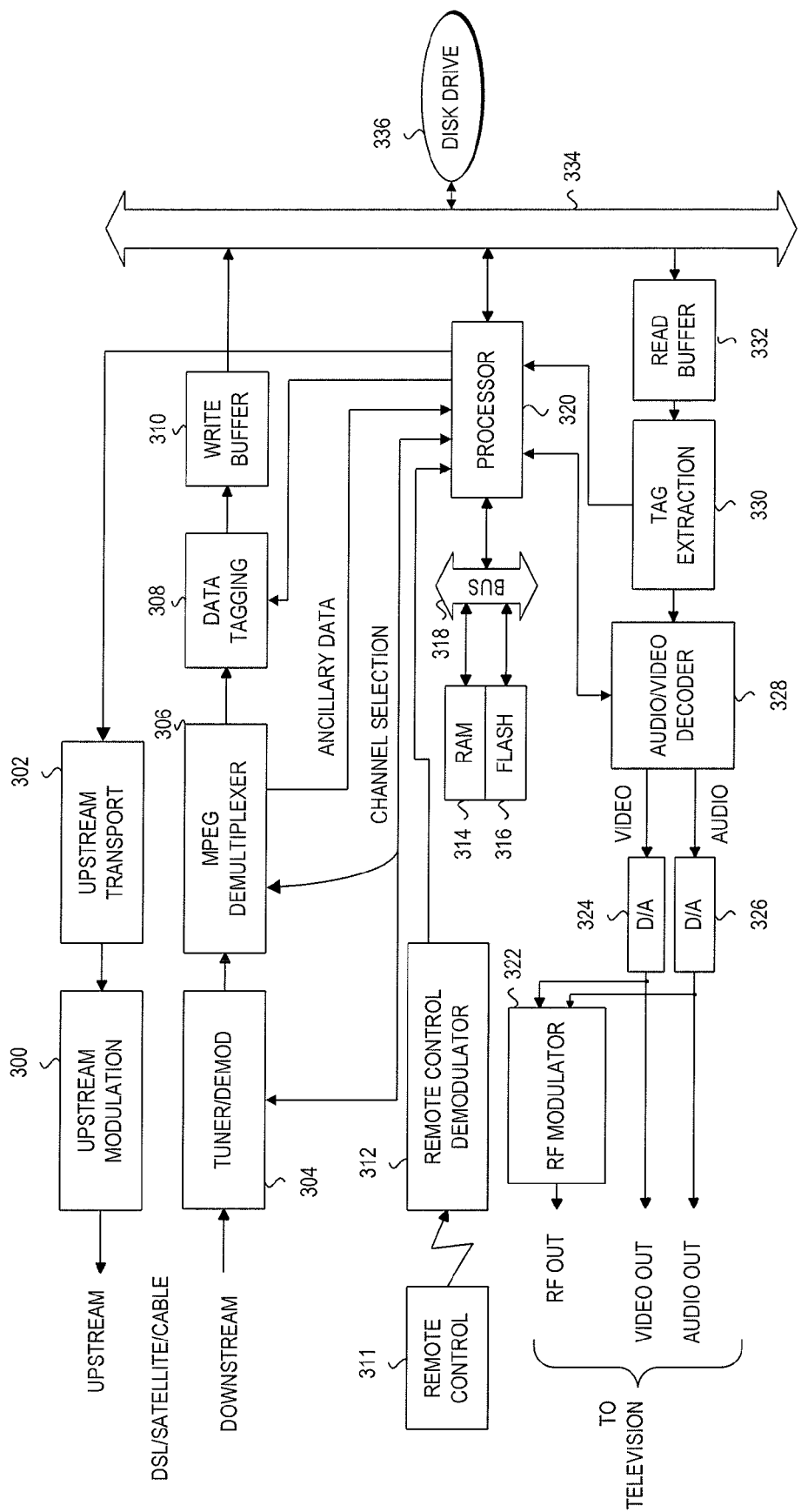
FIG. 3 illustrates an exemplary system diagram of a Personal Video Recorder (PVR)

The PVR may be a standalone unit or may be integrated into a cable or satellite set-top box (STB). A variety of output formats can be supported including analog S-video and composite video formats. Digital outputs may be supported (e.g. IEEE 1394 which is herein incorporated by reference) and the PVR may form part of an in-home network or distributed media storage and playback network. Applicants' provisional application Nos. 60/281,037 and 60/329,992 provide additional descriptions of PVR functionality Residential PVR FIG. 3 illustrates an exemplary system overview of a PVR-enabled set-top box (STB PVR) or residential gateway (RG) that contains the basic functionality necessary to support upstream and downstream data transmission, digital television reception and presentation, and storage of digital video programming. The system contains a tuner/demod 304 that provides for the reception of programming and data. In some systems (such as cable systems) multiple demodulators may be used to provide simultaneous delivery of digital video/audio (MPEG) and Internet Protocol (IP) data. An MPEG demultiplexer 306 selects (filters) a single program from a multiple program stream. The MPEG demultiplexer 306 may contain a transport stream demultiplexer, Program Identifier (PID) filters, and a conditional access system. A data tagging unit 308 adds metadata descriptors to video to be recorded. The metadata is used by the PVR to identify and characterize programs. A write buffer 310 buffers video to accommodate disk access.

An upstream transporter 302 prepares data including the steps of packetizing, error protection, and other transport related functions. An upstream modulator 300 performs modulation and serves as the access protocol manager. As with most set-tops or televisions, a remote control 311 works in conjunction with a remote control demodulator 312 to allow remote control and programming of the PVR unit. A processor 320 runs middleware, PVR control software, and targeted advertising software. An actual implementation may use more than a single processor. As an example, one processor may be used to manage the core hardware resources, while a second processor may be used to handle middleware and PVR operations.

Random Access Memory (RAM) 314 and flash memory 316 are connected to processor 320 via a processor bus 318. Storage of programming is provided using a disk drive 336 although other types of high-capacity non-volatile memories may be used including memory sticks, write-read optical memories, or other magnetic, electronic, optical, magneto-optical, electro-optical or acousto-optical storage systems. The disk drive 336 is connected to the write buffer 310, processor 320, and a read buffer 332 through a system bus 334. The read buffer 332 buffers video to accommodate disk access. A tag extraction system 330 extracts metadata descriptors from recorded video. An audio/video decoder 328 decodes digital video and audio, examples of which are MPEG video and MPEG/AC-3 audio. The video D/A 324 and audio D/A 326 convert video and audio signals respectively to analog signals that can be sent directly to S-video or RGB inputs on a television or to an RF modulator 322 which can modulate the signals onto an appropriate TV channel.

As previously discussed, the PVR may be connected to a variety of networks including a cable network which supports one or more digital video and/or data protocols including any of the Motion Picture Expert Group (MPEG) video standards and the Data Over Cable Interface Specification (DOCSIS) protocol. The PVR may alternatively receive signals from a satellite and can potentially be connected to the Internet (for return signals) via a telephone line or other network connection. In the satellite embodiment, the PVR can receive advertisements from the satellite network or potentially over the telephone line or other network connection. The telephone line or other network connection can be utilized to report back viewing statistics and ad viewing information. In another embodiment, signals are sent back through the satellite or via a land based wireless connection.

In a DSL embodiment, the PVR is connected to a telephone line which supplies video signals and which can simultaneously serve as a data network for two-way communication with the PVR. For Internet based video, the PVR can be connected over a variety of network types and can receive streaming media broadcasts. The signals may be unicast or multicast and can be delivered from a centralized server, a distributed server system, or via an edge network. PVRs can also be used with broadcast (over-the-air) networks and microwave "wireless cable" systems. When used in conjunction with these delivery systems, an appropriate return path (either telephone, cable or other network connection) can be used to provide two-way capability to the PVR.

Video on Demand (VoD)

Figure 4:
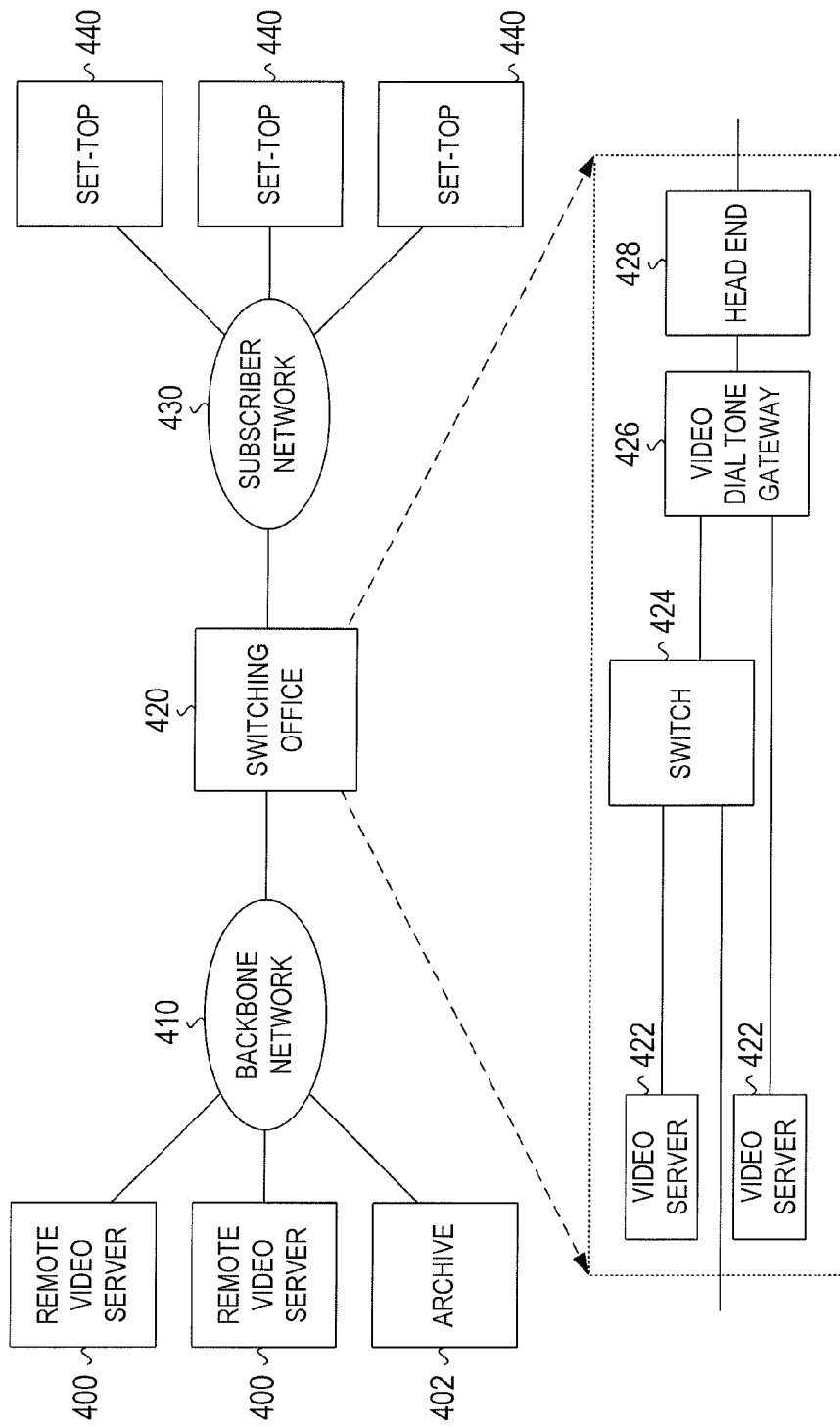
FIG. 4 illustrates an exemplary system diagram of a Video-on-Demand (VoD) network.

The ability to provide video programming to the consumer at the exact time that they desire that programming is known as Video on Demand (VoD). A VoD system allows a subscriber to retrieve a movie at any time. A true VoD system also includes the ability to pause the movie, fast forward through the movie, rewind, or stop at any point in the programming. FIG. 4 illustrates an exemplary VoD system that includes remote video servers 400 that store video; an archive 402 that stores items such as infrequently viewed movies; a backbone network 410 that is used for the distribution of digital video from the remote video servers 400 to a switching office 420; a subscriber network 430 which connects the switching office 420 (more precisely head-end 428 within the switching office 420) to set-tops 440.

Within the switching office 420 various components are used to provide the VoD service including video servers 422, a switch 424, a video dial tone gateway 426 and the head-end system 428. The video servers 422 provide "local" or "edge" storage capability that allows video that is accessed more frequently to be stored closer to the subscriber than across the network on the remote video server 400 or archive 402. The switch 424 is used to direct traffic to the video dial tone gateway 426 that provides a subscriber interface as well as providing Operational Support Systems (OSS) and Traffic & Billing (T&B) functions. In operation, the video dial tone gateway 426 can present the subscriber with a menu for services which can guide the subscriber through the sources for video (content providers) and present the pricing information if the video is being sold on a per-unit basis (as opposed to a subscription service). The video dial tone gateway 426 thus insures that the subscriber can select the appropriate video content, that the content is accessed from the correct video server 400, 422 or the archive 402, that the head-end 428 and the set-top 440 are appropriately configured to transmit and receive the content respectively, and that billing records are created. Although the OSS and T&B systems are not illustrated in FIG. 4, they can be incorporated into the video dial tone gateway 426 or may be a separate systems located in the switching office 420 or elsewhere in the network.

The head-end system 428 represents the set of equipment that is needed to deliver the advertisement over the specific delivery platform in the subscriber network 430. The subscriber network 430 may be a cable system based on Hybrid Fiber Coaxial (HFC) technology, a DSL network, or a land or satellite based wireless network. In the case of an HFC network, the head-end system 428 will typically multiplex a number of VoD streams together and modulate the multiplexed stream onto one or more Quadrature Amplitude Modulated (QAM) channels. For a HFC network, there will typically also be a return channel that may consist of a DOCSIS based modem in the set-top and corresponding Cable Modem Termination System (CMTS) in the head-end 428. The return channel transports requests and commands from the set-tops 440 to the head-end system 428. Alternative downstream modulation formats and return paths can be utilized.

In the case of a telephone type network based on DSL technology, the head-end system 428 can consist of a terminal such as a Broadband Digital Terminal (BDT) or Host Digital Terminal (HDT) which receives video signals and prepares them for transmission to field located distribution equipment in the subscriber network 430. The transmission is typically via a fiber optic connection and is done in stages in which the fiber carries a signal from the switching office 420 to a terminal located in the field such as a Universal Access Multiplexer (USAM) or Digital Subscriber Line Access Multiplexer (DSLAM). From this point in the network the signals can be transported to the set-top 440 over twisted wire pairs using one of the DSL transmission technologies. Alternatively, the equipment in the network may be fiber optic based such that the transport to the home is entirely over a fiber optic connection, thus forming a Passive Optical Network (PON) or all optical Fiber to the Home (FTTH) network.

A distinction between the HFC network and the networks used by telephone service providers is that in the HFC network the bandwidth is typically shared between all of the subscribers on a cable node, whereas in a DSL network each subscriber has an individual connection with a pre-determined amount of bandwidth. This has an impact on the design and implementation of the head-end system 428, but should not affect the VoD functionality presented to the subscriber.

Satellite and land based wireless VoD systems will have head-end systems 428 which are yet distinct from cable and telephone network head-ends. Satellite systems can utilize a variety of return paths including satellite uplink, telephone line, Internet, or cable based. Both use sharing of the bandwidth on the downstream, with the satellite system extensively sharing bandwidth across the footprint of the satellite system. The VoD system can also be based on Internet Protocol (IP) and can use streaming media techniques, including unicast and multicast, to deliver the video across the backbone and subscriber networks (410 and 430 respectively) and to the set-top 440. Using the IP protocol allows for flexible delivery of the video, independent of the transmission technology in the subscriber network 430. The IP protocol will also provide for the ability to easily transport and store video within the home, thus supporting in-home networking and incorporation of the subscriber set-top 440 or personal computer into the VoD network.

The VoD system illustrated in FIG. 4 can be used to deliver video in various types of "on demand" formats including Quasi Video-on-Demand (QVoD) in which users are grouped based on a threshold of interest, and in which users can perform basic temporal control by switching to a different group. The system can also support Near Video-on-Demand (NVoD) in which functions like forward and reverse are simulated by transitions in discrete time intervals (e.g. 5 minutes). One mechanism for achieving this is to provide multiple versions of programming with small time skews between the versions. In true VoD services, the user has complete control over the session presentation including full-function digital VCR capabilities: play (forward and reverse), pause, fast-forward, rewind, and random position.

Head-End Based PVR or Personal Video Channel

A head-end based PVR, also known as the Personal Video Channel (PVC), is an implementation of the PVR in which the storage function is performed outside of the subscriber residence. The PVC implementation makes use of the storage inherent to the VoD system to form and manage the PVR. One advantage of the PVC implementation is that the STB needs less functionality (i.e., no storage) and thus has a lower cost. One of the drawbacks of the PVC is that when the penetration of the PVC service reaches a certain point the cost of bandwidth to deliver the stored programming exceeds the cost to have individualized (residential) PVRs.

Figure 5:
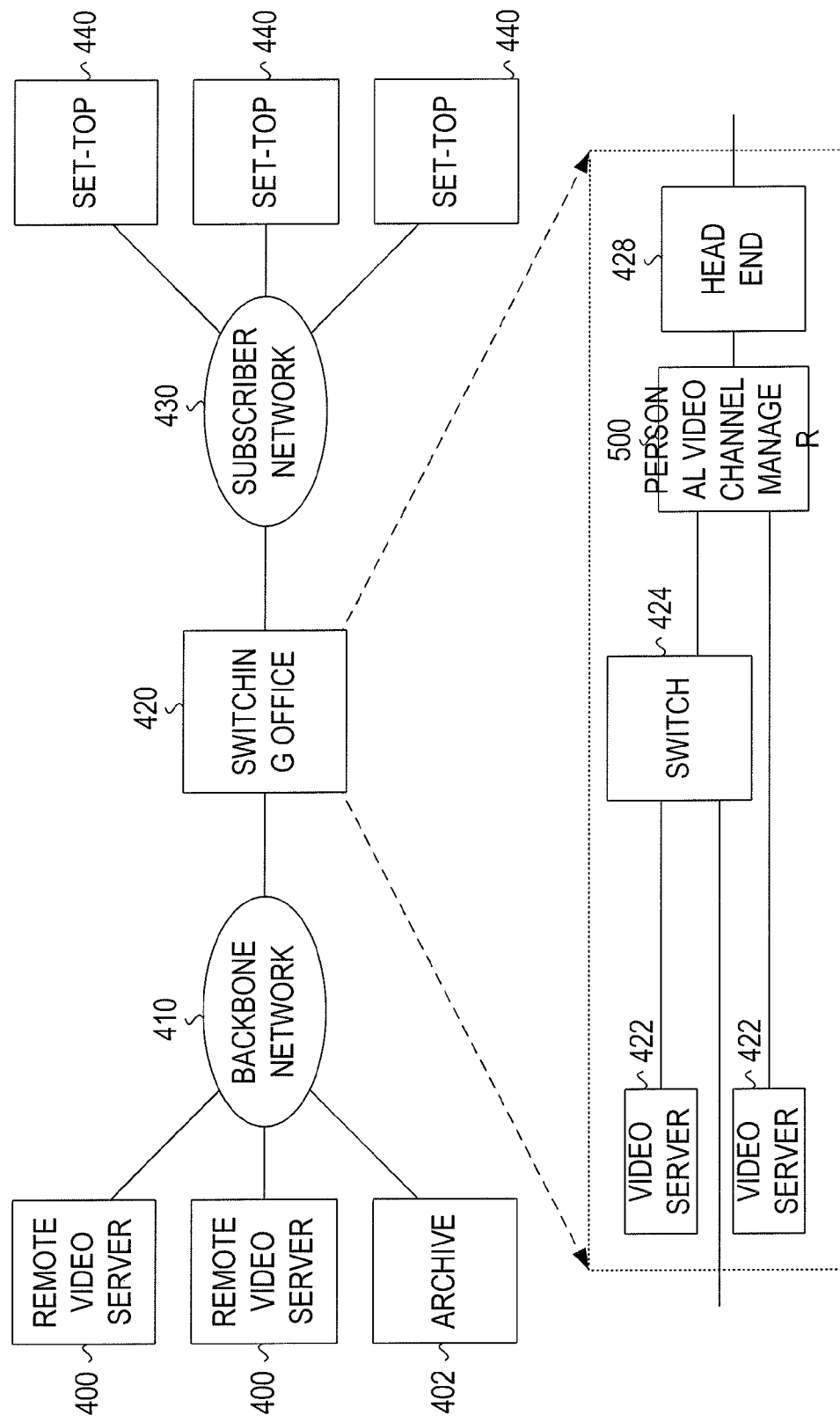
FIG. 5 illustrates an exemplary system diagram of a Personal Video Channel (PVC) head-end based PVR network.

FIG. 5 illustrates an exemplary implementation of a HE PVR. In this embodiment, the video dial tone gateway 426 of FIG. 4 is replaced by a personal video channel manager 500. The personal video channel manager 500 provides the PVR functionality to subscribers by managing their stored programs and accessing the stored programming on command, just as in a VoD system. The principal distinction between the VoD system and the PVC is that in the PVC recording is enabled so that users can request that a particular program be stored. In the event that the programming is a live event and therefore not presently stored, the personal video channel manager 500 insures that the programming is recorded on video server 422 or on another storage unit. If more than one user requests that a program be recorded, personal video channel manager 500 notes that the program has already been recorded and can prevent additional copies from being made.

Advertising Opportunities on PVRs

From an advertiser's perspective, the PVR offers a tremendous range of possibilities for directing advertisements, both of the traditional 30 second type as well as various types of virtual advertisements and overlays, as will be described herein. The digital storage medium can store a large number of advertisements in addition to the recorded programming. The basic functionality of the PVR will allow for the insertion and splicing of these ads into playback material. The ads stored in the PVR will be ads determined to be relevant to the household (and individuals within the household). The ads may be filtered prior to being received by the PVR or the PVR may itself act as the filtering mechanism.

The PVR may have the ability to profile viewers and identify which viewer (or group of viewers) is interacting with the TV. Based on the viewer profiles and/or viewer identification, the PVR can deliver specific (targeted) advertisements. The ability to profile viewers and to identify viewers in a household based on their viewing characteristics is described in Applicants' co-pending U.S. patent application Ser. No. 09/204,888 (now U.S. Pat. No. 7,150,030); WO/99/33160; U.S. patent application Ser. No. 09/516,983 (now U.S. Pat.

No. 7,240,355); U.S. patent application Ser. No. 12/871,526; U.S. patent application Ser. No. 09/591,577 (now U.S. Pat. No. 7,949,565); U.S. patent application Ser. No. 09/635,252; U.S. patent application Ser. No. 09/205,653 (now U.S. Pat. No. 6,457,010); U.S. patent application Ser. No. 09/452,893 (now U.S. Pat. No. 6,684,194; WO 00/33233; and U.S. patent application Ser. No. 09/635,253 (now U.S. Pat. No. 6,714, 917). The targeted ads may either be spliced into a live or prerecorded program, overlaid on a program, inserted into programming, or through other means that would be obvious to one of ordinary skill in the art.

The PVR can also report back viewing statistics and provide the advertiser information with respect to the effectiveness of the advertising (i.e., how many viewers are watching the ads and to what degree of completion). The advertiser can use the PVR to achieve one-to-one marketing capability by insuring that the right ads are delivered to and ultimately displayed to the right viewers. Although it is technically possible to learn about each viewer individually, privacy concerns and the well-established mass advertising techniques used by major advertisers are likely to result in a migration to one-to-one advertising on PVRs through the formation of market segments. In forming market segments advertisers specify characteristics of the viewers they want to reach. Although some of these characteristics may be related to viewing habits, it will ultimately be possible to generate a list of viewers (e.g. viewers coming off lease of a certain type or brand of vehicle in the next 6 months), have those viewers placed in a specific market segment, and deliver the ad to those viewers for subsequent display. To protect privacy the advertiser may not be provided with any user identifiable information, and in some cases will only know the number of individuals or households in the designated market segment. It is therefore possible to create very specific market segments without revealing personal information.

As previously mentioned, one potentially powerful way to advertise and direct advertisements on PVRs is through the substitution of (or manipulation of) traditional video advertisements (i.e., 30 second ad that appears in broadcast programming, ads that are pre-pended or post-pended in VoD programming). The PVR can substitute ads during live programming (play or recording of) or when pre-recorded programming is being played back. Another opportunity for advertising on PVRs is through the program guides. The program guides provide graphical information regarding current and upcoming programming. Modern program guides (typically referred to as Interactive Program Guides or IPGs) have incorporated graphical advertising as part of the program guide. The ads that can be placed in the advertising portion of the IPG include static advertisements inserted in the IPG, video clips and streaming media played through the IPG, and combinations of static ads and video clips displayed in the IPG. Another advertising opportunity on the PVR is the display of ads when channel changes (can be considered a trick play event) are made or while information is being retrieved from the local hard drive or other server. In this embodiment the channel change or pause can be considered to be trick play events. Applicants' patent applications U.S. patent application Ser. No. 09/658,204; U.S. Provisional Patent Application 60/238,056; U.S. patent application Ser. No. 12/643,599 (now U.S. Pat. No. 8,042,131); U.S. patent application Ser. No. 09/680,622; and U.S. patent application Ser. No. 09/751,349 describe targeting advertisements in IPGs, recorded programming and during channel changes.

PVRs may also utilize virtual ads (a variety of ways to advertise products within the programming itself) as an additional advertising opportunity. Virtual ads include the superpositioning of an advertisement on a billboard, or substitution of one product label for another in the programming (also referred to as product placement). For example, an actor or actress may be holding a soda (e.g. Pepsi) in a scene of a show and the original Pepsi label can be replaced with a Coca-Cola label. Techniques for performing virtual ad insertion including background overlays and product placement are well known to those skilled in the art and are described in U.S. Pat. Nos. 5,543,856; 5,627,915; 5,808,695; 5,892,554; 5,593,076; 6,100,925; and 6,184,937 all of which are herein incorporated by reference. Other types of virtual ads include graphical overlays and "bugs" similar to the network promo graphics which are superimposed on programming today. Applicants' provisional applications 60/281,037 and 60/329,992 describe the use or virtual ads in more detail.

Stored ads offer the possibility of presenting ads to subscribers "on demand" such that the subscriber is presented with the option to view one or more ads and chooses to do so. These ads are stored on the recording medium and retrieved when the user requests the ad, either through a direct selection on a menu, or by indicating interest by clicking on an object in the programming or presented in a static ad. Stored ads and infomercials can be organized and presented by subject matter, and can be targeted to a household based on the preferences and demographics of the household. Stored ads let viewers browse ads which they have determined have a high entertainment value. In addition, a payment/incentive system can be created to encourage viewers to watch ads. One advantage of stored ads is that the ads/themes/products which are of interested to the household can be easily identified by monitoring which ads they select and how many times they select them. Applicants' provisional application 60/281,196 describes the selection of ads in more detail.

Interactive ads can also be utilized to deliver advertising to subscribers. In the interactive ads a user may be prompted to indicate which ad he/she wants to watch and then may asked to interact with that ad. The advantage of interactive advertisements is that the user is participating in the advertisement, which is likely to have a significant and positive impact on recall. The interactive ad can also supply a vast amount of information to the viewer. In one embodiment, hyperlinks are presented in the ads which allow the user to access information from the Internet or stored on the hard drive.

As can be readily understood, having storage capability as part of the STB or in a VoD/PVC system allows for tremendous flexibility in the delivery of advertising. Although the fast-forward feature may limit the value of traditional advertising, many new delivery mechanisms for advertising are being envisioned.

Ad Queues and Ad Queue Management

Because of the potential for delivering a variety of types of ads and the desire to target those ads, new management systems are required for advertising on PVRs. Ad queues form part of this ad management system and allow for the organization and presentation of different ads to different market segments and different subscribers. Ad queues can be best understood in the context of a client side set-top box targeting system 600 such as that illustrated in FIG. 6A. The client side STB ad targeting system 600 is a software application that may be integrated into a PVR-enabled set-top box (STB PVR). The middleware package or the underlying operating system (OS) provides communication between the client side STB ad targeting system 600 and other components in the STB. The targeted advertising features of the client side STB ad targeting system 600 permit the device to analyze viewer behavior (shows watched, channel surfing habits, commercial watching, etc.), infer viewer profiles (demographic, psychographic, and behavioral attributes), select and present advertisements based on user profiles derived from one or more of the following: a demographic database, volunteered information, profiles, or an autonomous agent.

A cue message decoder 604 provides the functionality for decoding cue messages. Cue messages are embedded in network video feeds. They indicate the presence of advertisement opportunities ("avails") for the insertion of advertisements. For digital-into-digital ad insertion systems, the cue messaging may be based on the SCTE DVS-253 standard which is herein incorporated by reference in its entirety.

A metadata decoder 608 delivers all received metadata to the client side STB ad targeting system 600. The Metadata system may be based on the TV-Anytime Forum and MPEG-7 Metadata specifications. Metadata is data that is associated with a particular section of content that describes that content. Metadata includes descriptive items such as title, genre, cast, production company and production crew, language and other program related information. Metadata may also include the content's typical or intended demographic and psychographic groups.

An MPEG video switch 612 provides the functionality to seamlessly splice MPEG video/audio sequences. This function allows for clean insertion of ads. Splicing of MPEG video/audio sequences is well known to those skilled in the art.

A digital rights management 616 component deals with the protection of the programming and advertisements to ensure that the content provider's copyright is adequately protected. This protection can include assurances that no unauthorized copies are made.

A video storage 620 component is used to store all video/audio programs on the set-top box, including ads (commercials). The video storage 620 may be implemented using a mass storage device, such as a hard disk drive. Ad queues are used as part of or in conjunction with the video storage 620 to provide proper sequencing of ads. A data storage 624 component is used to store program metadata, profiles, and other data. Some part of the data storage 624 component may be non-volatile (survives power loss).

A user interface 628, typically implemented through on-screen graphics and a remote control or remote keyboard, facilitates all of the control and interactions with the television viewer. Some of the interactions will be used by the client side STB ad targeting system 600 to help build the viewer profiles necessary to do individual ad targeting.

An upstream data transport 632 provides the service for sending data to the head-end system. The upstream data transport 632 works in conjunction with the hardware to send signals upstream over cable, twisted wire pair, wireless, fiber, or other connection.

Figure 6A:
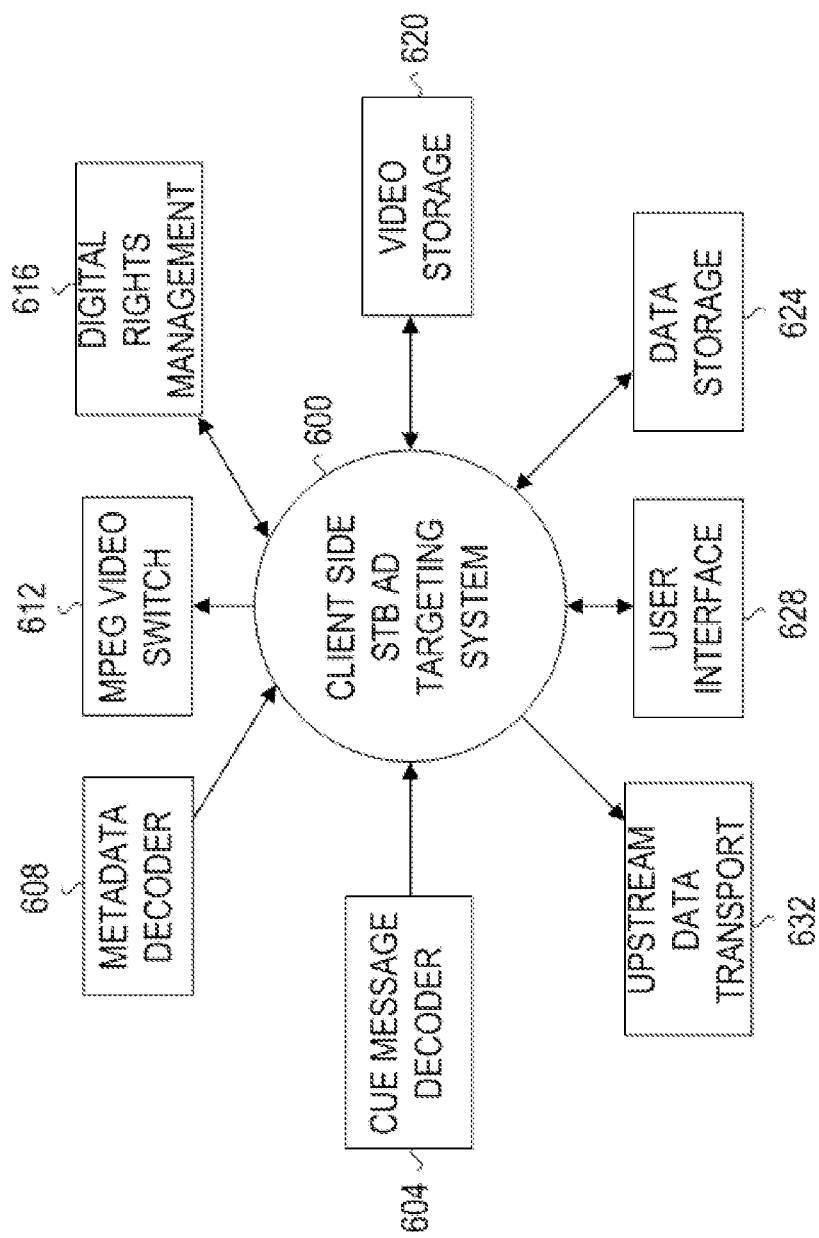
FIG. 6A illustrates an exemplary context diagram of a client side set-top box (STB) ad targeting system.
Figure 6B:
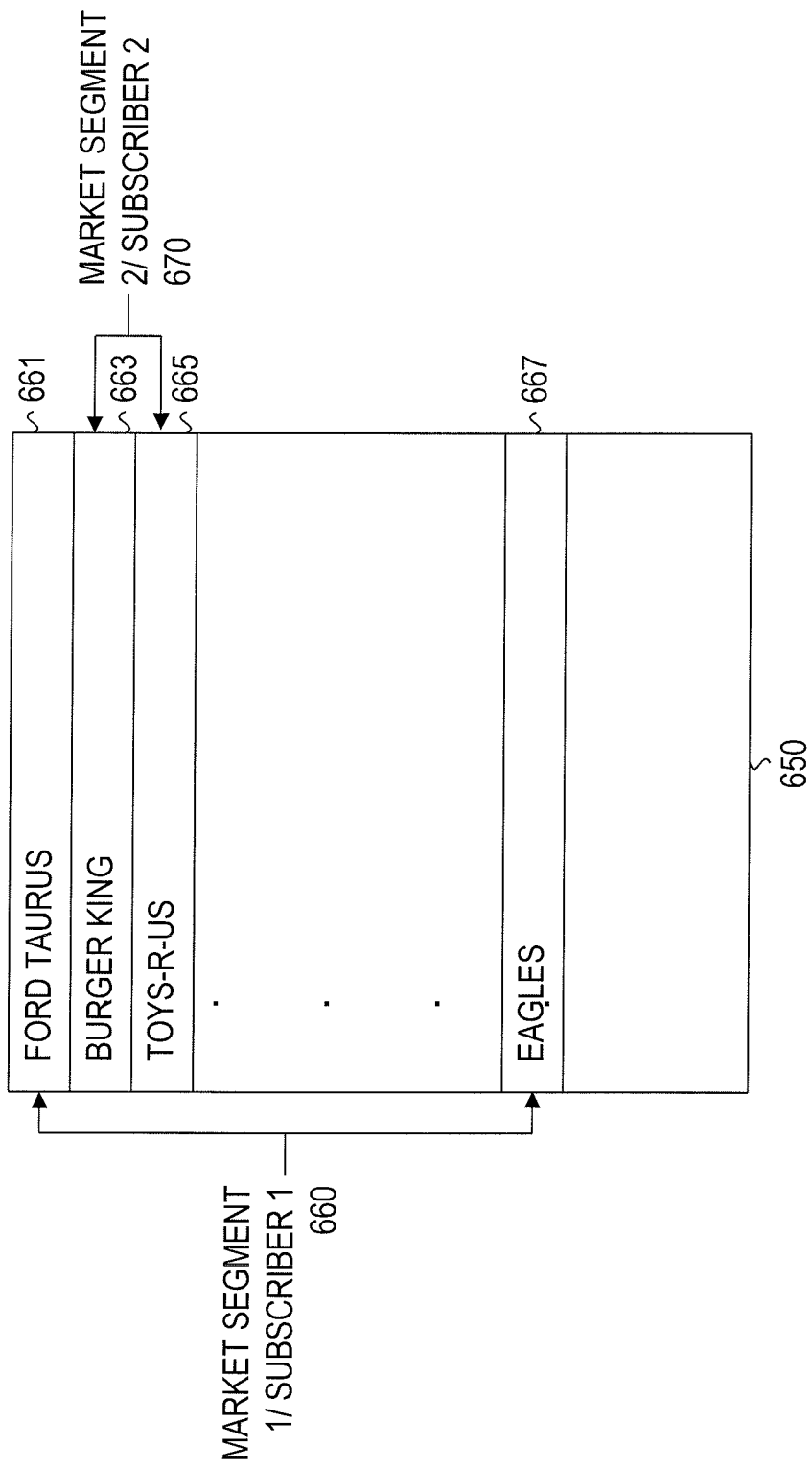
FIG. 6B illustrates a single ad queue structure for multiple market segments/subscribers.

FIG. 6B illustrates a single ad queue 650 for multiple market segments/subscribers. The ad queue 650 is a data structure which provides organization to the ads that are to be played. Although the ads referred to here are video ads, the ads may be of any type (virtual ads, IPG ads) or a combination of various types of ads. The ad queue 650 contains pointers, or Ad Resource Locators (ARLs), that indicate which ad is to be played. The ARL can be in the form of a file name or may be an actual address on a hard drive. The ARL can point to a locally stored ad or a remotely stored ad. The ad queue 650 can be local within the STB or can be at the head-end. As illustrated, the ad queue 650 contains a number of ARLs including a first ARL 661 indicating that a Ford Taurus ad is to be played, a second ARL 663 pointing to a Burger King ad, a third ARL 665 pointing to a Toys-R-Us ad, and a fourth ARL 667 pointing to an Eagles advertisement.

A mechanism to target ads is to form market segments into which groups of ads are placed. As illustrated, the first ARL 661 can be grouped with the fourth ARL 607 to form a first market segment 660. This first market segment may be for a large group or may be directed at a single subscriber in the household. A second market segment 670 can be formed to include the second ARL 663 and the third ARL 665.

Figure 6C:
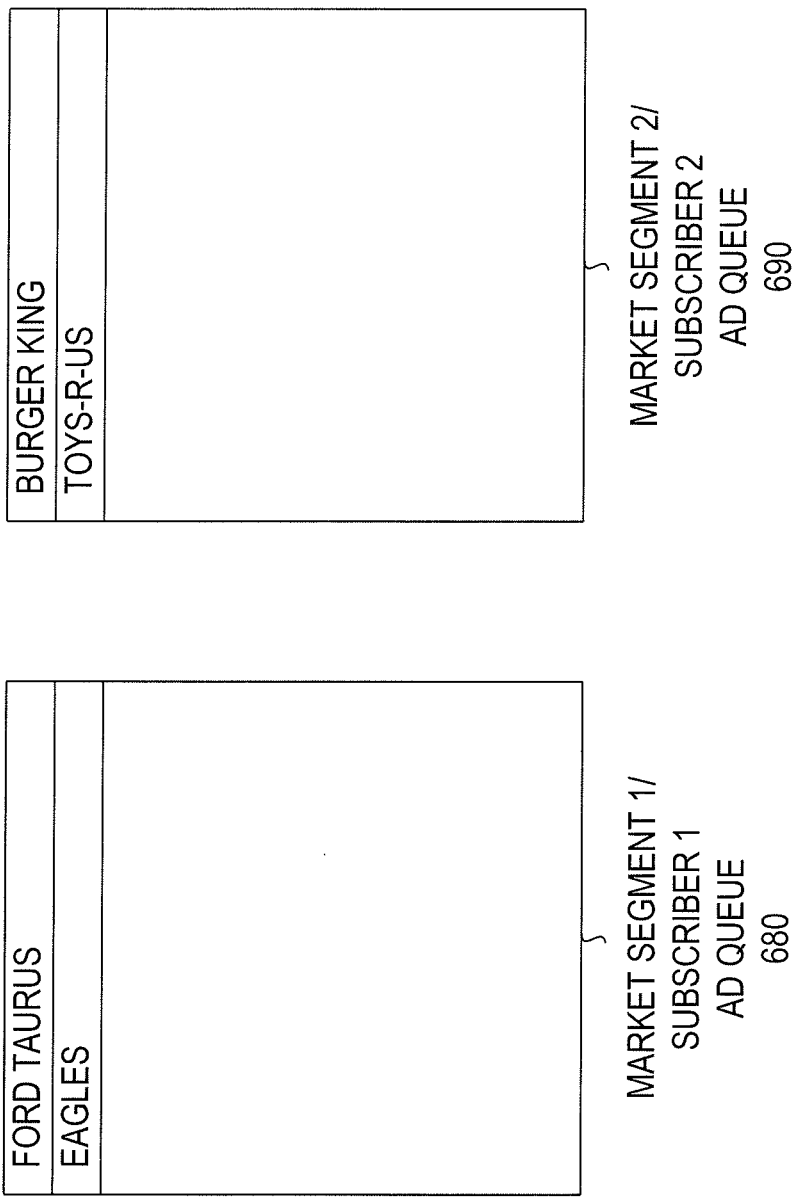
FIG. 6C illustrates the use of multiple ad queues for multiple market segments/subscribers.

FIG. 6C illustrates an alternate embodiment in which separate ad queues are utilized to store the names or addresses of the ads which are to be presented to the market segments or subscribers. A first ad queue 680 stores the ads associated with the first market segment 660 and a second ad queue 690 stores the ads that are associated with the second market segment 670. Although described in terms of advertisements, the ad queues can be used to direct trick play ads which can be targeted using all of the techniques developed for regular or virtual advertisements. Additionally, different versions of trick play ads can be generated such that when a first subscriber fast-forwards through an advertisement they get a different trick play ad than a second subscriber which fast-forwards through an advertisement.

Figure 7:
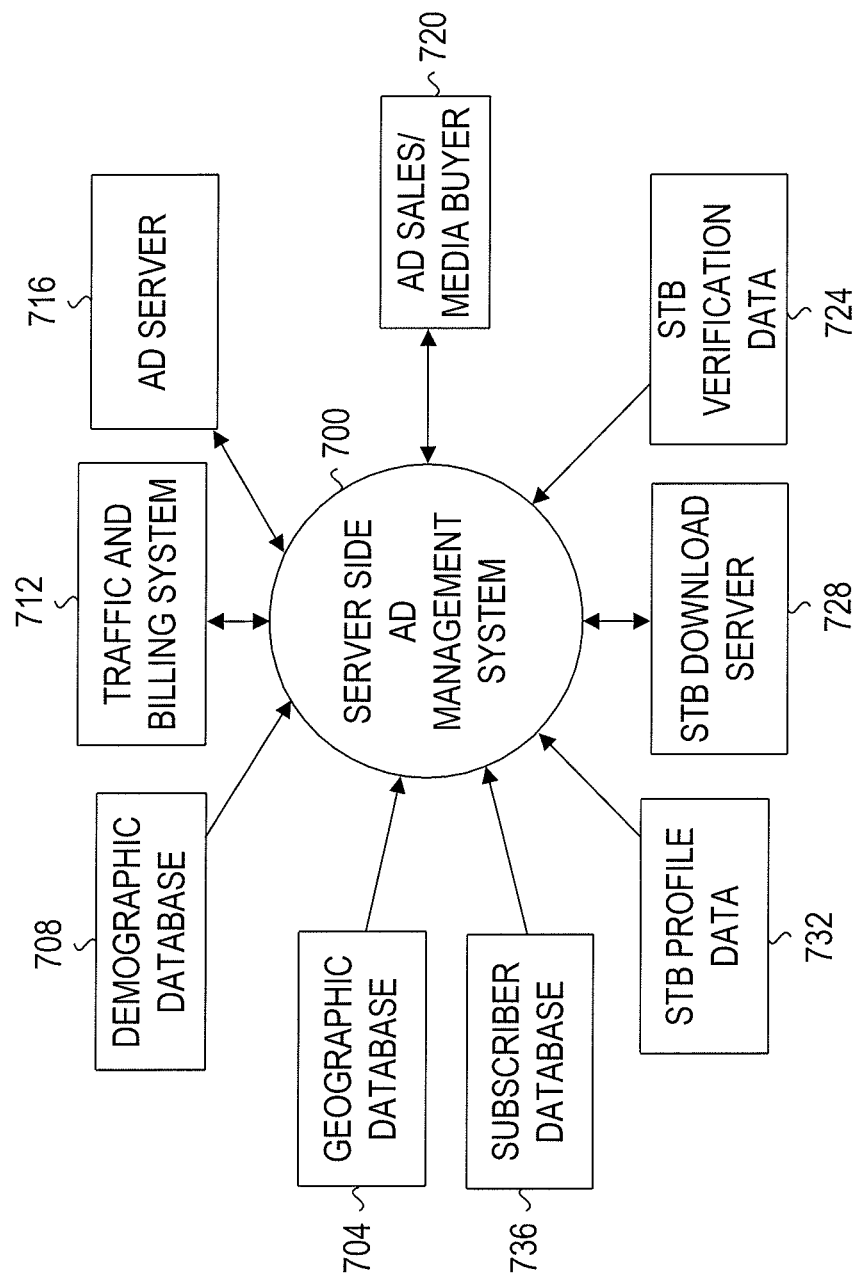
FIG. 7 illustrates an exemplary context diagram of a server side ad management system.

FIG. 7 illustrates an exemplary context diagram of a server side ad management system (AMS) 700. The server side AMS 700 contains a platform that manages the sales and distribution of television advertisements in the cable television, DSL, or satellite environments. The server side AMS 700 gives advertisers the ability to describe their advertisements in terms of target market demographics, required ad bandwidth, ad duration, and other ad specific parameters. The server side AMS 700 matches the ads to the advertising opportunities that occur in the package of programming either delivered to subscribers in real time or stored on the subscriber's PVR hard disk drive. In addition, the system will work with prepend/postpend ad opportunities in a VoD environment. The server side AMS 700 tracks avails including duration and bandwidth of the avail, and uses a number of algorithms to determine if the ad can be placed in the avail.

The targeted advertising features of the server side AMS 700 support and manage all of the head-end/CO activities required to facilitate the targeting of television adverting on PVR-enabled set-top boxes (STB PVRs). The functionality of the server side AMS 700 includes market segmentation, geodemographic database management, viewing statistics collection, profile aggregation, ad server content and distribution management, content metadata management, STB software management, interface to traffic and billing systems, and support of the ad sales process.

A geographic database 704 describes the subscriber area based on map information and other geographic sources. This information is used to create maps of the subscriber area indicating market segmentation. A demographic database 708 describes the basic demographic characteristics of the neighborhoods within the subscriber area. This information is used by the server side AMS 700 to establish baseline market segments for ad targeting. A subscriber database 736 includes identification, location, and services for each subscriber served. A traffic and billing system 712 is used by the service operator to provide support for the ad insertion process. The traffic and billing system 712 manages customer contracts and schedules, manages media and controls ad insertion equipment, reconciles verification lists from ad insertion equipment, creates affidavits and invoices, and helps ad sales staff with analysis and sales projections. An ad server 716 stores and distributes all of the advertisements for a particular set of subscribers. An ad sales/media buyer 720 includes the provider's ad sales professionals, the advertisers, their ad agencies, and media planners/buyers. All of these people use the server side AMS 700 to plan and implement a targeted advertising campaign.

An STB profile data 732 may come from the profiling engine within the STB and is used by the server side AMS 700 to refine the ad targeting strategy and market segmentation. A STB download server 728 is responsible for maintaining the software for the STBs. A STB verification data 724 may come from the STB ad queue system and is used to verify that a particular ad was presented to a particular viewer. Applicants' patent applications U.S. Ser. No. 09/553,637 (now U.S. Pat. No. 6,820,277) and WO 00/64165 describe the AMS in more detail.

Figure 8:
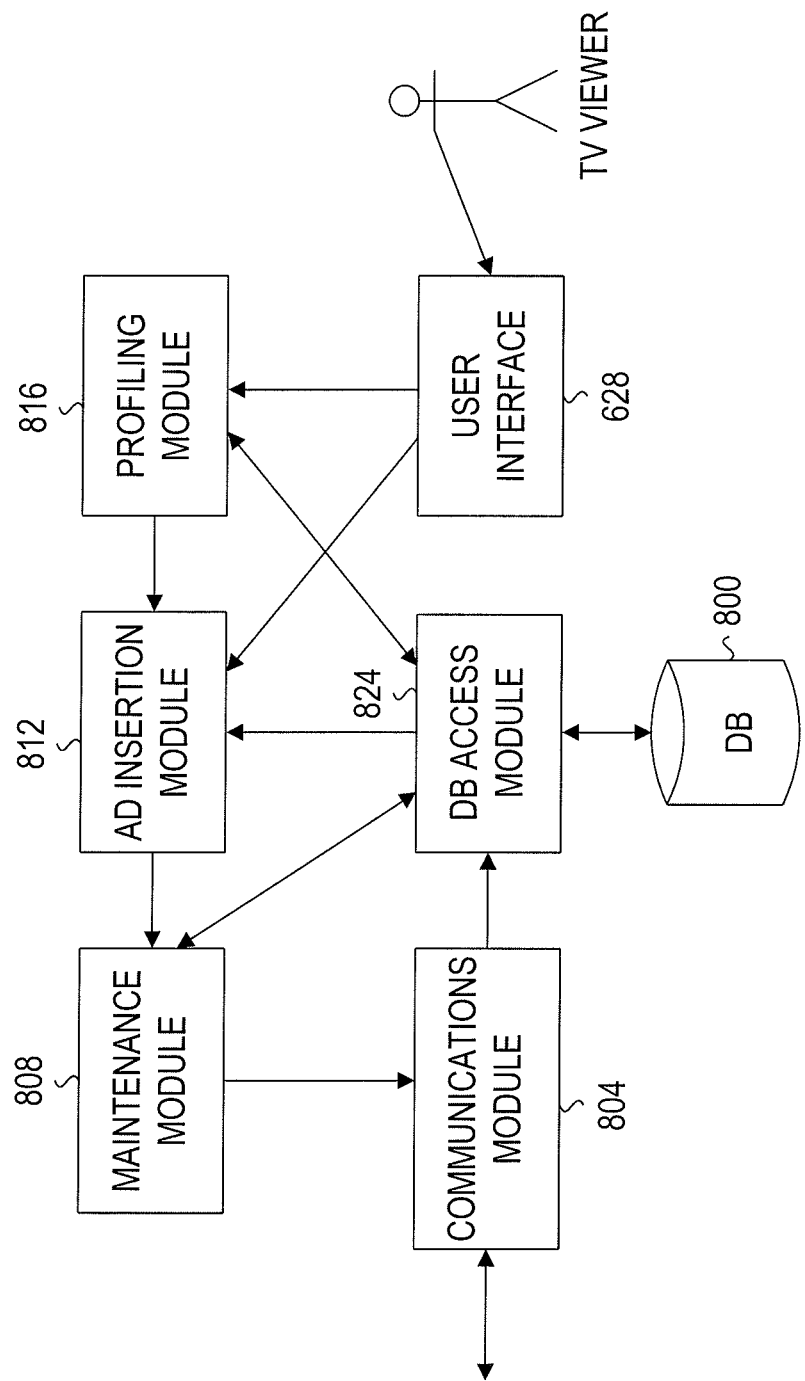
FIG. 8 illustrates an exemplary block diagram for a client side STB ad targeting system.

FIG. 8 illustrates an exemplary block diagram for the client side STB ad targeting system 600 of FIG. 6. A communications module 804 handles the interactions with the server side ad management system 700, uploading and downloading data as required for system operation. An ad insertion module 812 handles the processes necessary to incorporate targeted ads into television programs, including programs received in real-time or being played from the set-top box's hard disk. The ads may be inserted into the program material at indicated points or "avails" (through cue messages), or inserted before (pre-pended) or after (post-pended) a program. A profiling module 816 analyzes user actions and habits and infers demographic, psychographic, and behavioral characteristics of the viewing household and individual viewers. A maintenance module 808 handles all maintenance of the ad queue and program table. A database module 800 stores information essential to the operation of the ad queuing and profiling system including viewer signatures, ad and program information (metadata), and possibly the ads themselves. A database access module 824 manages all access to the set-top database. The database access module 824 coordinates file system issues, multiple simultaneous requests, etc. The user interface module 628 receives input from the remote control keypad or keyboard associated with the set-top box, selects appropriate events, and directs these events to the proper destinations within the ad queuing system.

Figure 9:
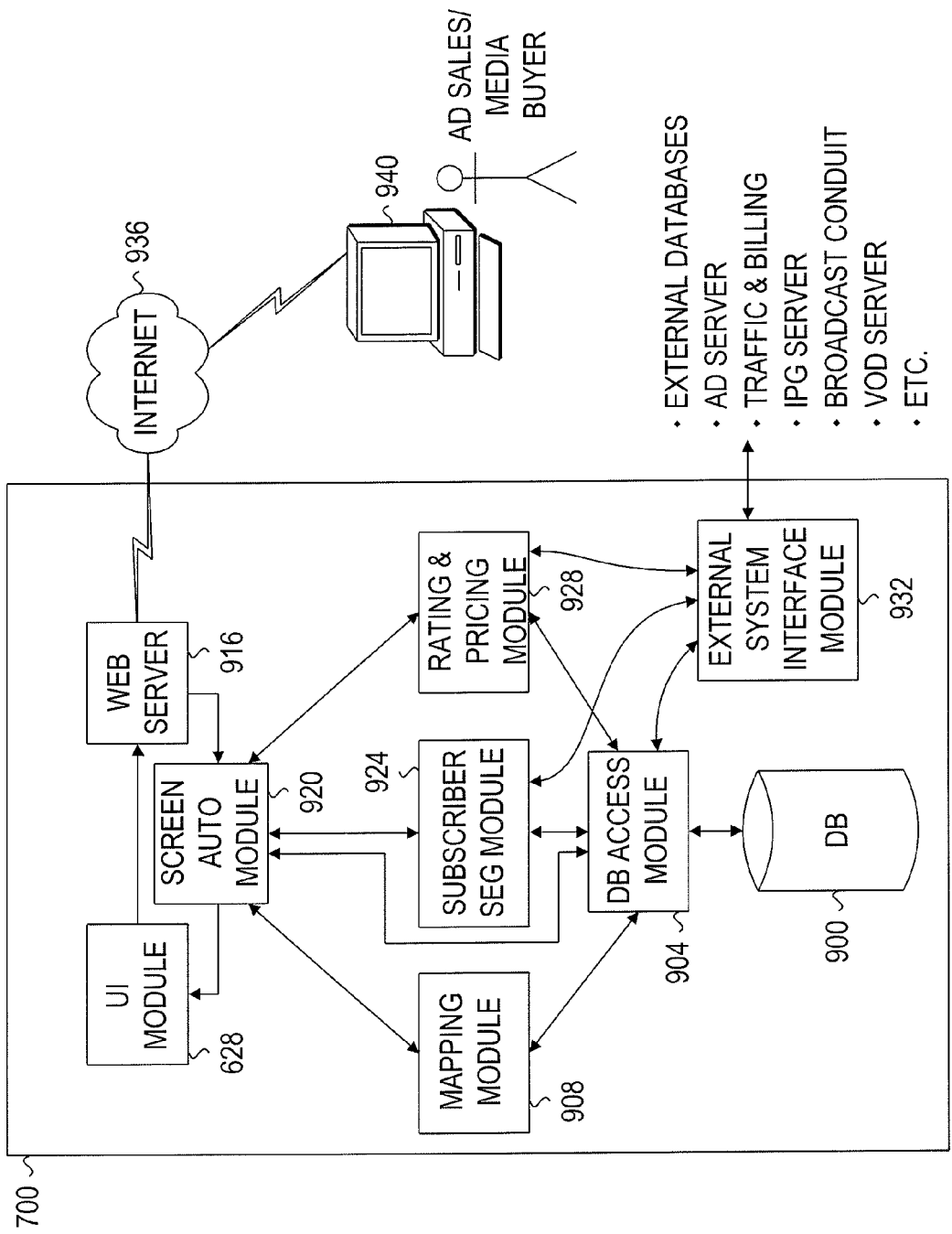
FIG. 9 illustrates an exemplary block diagram of a server side ad management system.

FIG. 9 illustrates an exemplary block diagram of the server side ad management system 700 of FIG. 7. A web server 916 provides the front end to the ad sales/media buyer interface. The use of a web server 916 for this application allows access to anyone with an appropriate web browser and access to the Internet 936. A screen automation module 920 encapsulates the logic behind each of the presentation screens for the ad sales/media buyer interface and manages all of the communication between the web-based interface and the underlying database and processing engines. The UI module 628 renders web pages based on stored configuration data and the output of the screen automation module 920. A mapping module 908 creates geographic maps of selected subscriber areas including demographic boundary identification and market segment assignments. A subscriber segmentation module 924 uses demographic, geographic, and subscriber data to form groups of subscribers that fall into predefined market segments. These groups may be bounded by cable node or cluster boundaries.

A rating and pricing module 928 estimates the effective rating for a particular targeted ad campaign and creates pricing information based on this rating and the provider's basic pricing structure. An ad management database 900 stores all of the subscriber, demographic, market segment, validation, and other data required for the server side ad management system 700. A database access module 904 manages all access to the ad management database 900. The database access module 904 forms appropriate queries based on requests from other system services and coordinates multiple simultaneous requests. An external system interface module 932 provides a single point of connection between the server side ad management system 700 and third party systems such as Traffic and Billing, and geodemographic service providers.

Figure 10:
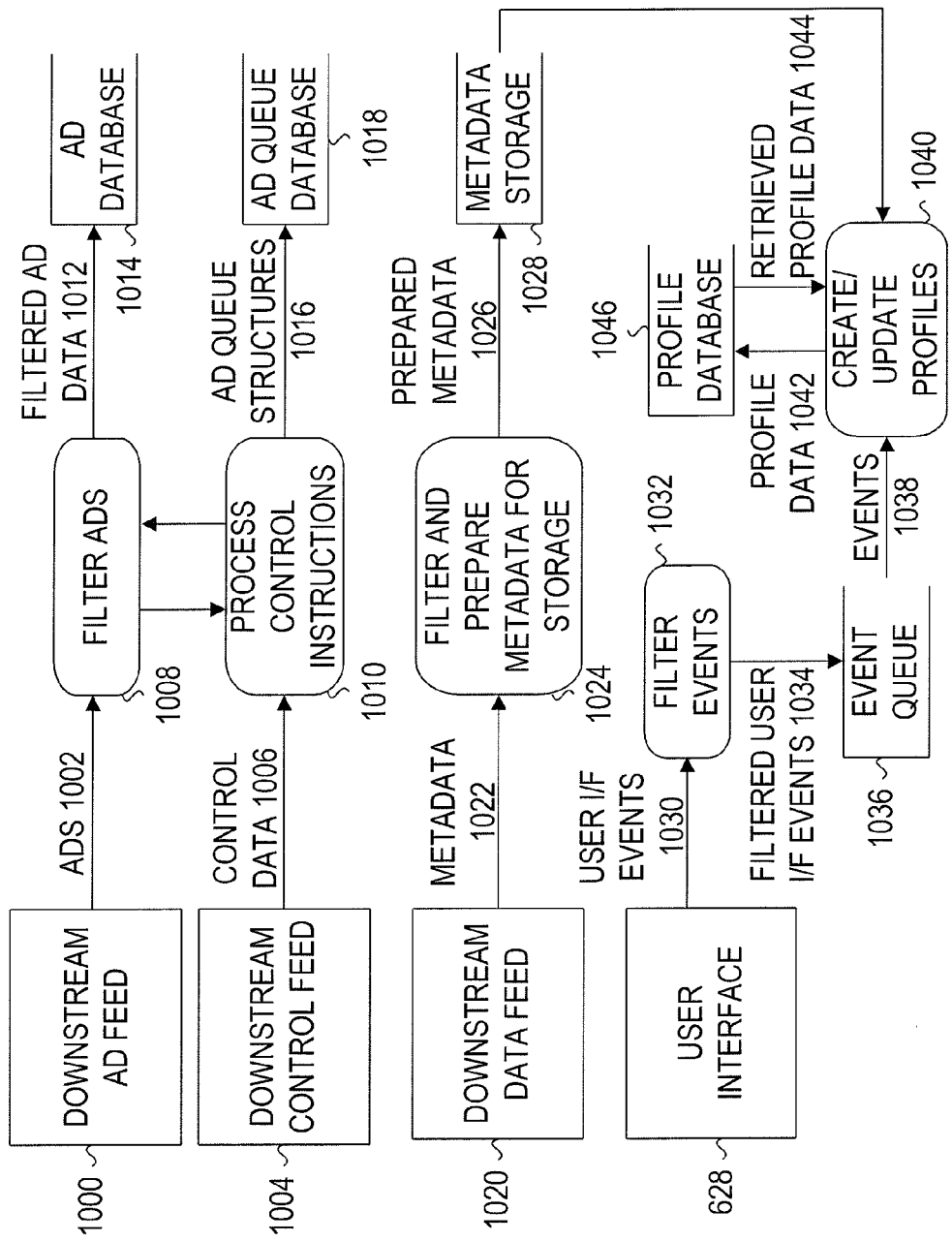
FIG. 10 illustrates an exemplary data flow in a PVR-enabled set-top box for delivering targeted advertising.

FIG. 10 illustrates an exemplary data flow in a STB PVR (PVR enabled set-top box) for delivering targeted advertising. The STB differentiates individual viewing habits, characterizes the current viewer based on current and historical viewing information, and selects advertising appropriate for the current viewer based on the characterization. Ads 1002 are received by the STB PVR from a downstream ad feed 1000 for storage and subsequent presentation to the viewer. Control data related to ads (ad metadata) 1006 is received by the STB PVR from a downstream control feed 1004. The control data 1006 includes descriptions of the ad content, target audience, encoding attributes, delivery instructions, and contract limitations. The control data can be created by a number of parties including the ad producer, advertiser, media buyer, network operator, and broadband service provider. The set-top box can supplement this control data by adding presentation history and user interaction data.

The ads 1002 are filtered 1008 and the filtered ads 1012 are stored in an ad database 1014. The ad database 1014 resides in a large capacity long-term storage device, such as a hard disk. The control data 1006 is processed 1010 to generate ad queue structures 1016 that are stored in an ad queue database 1018. The ad queue database 1040 also stores the ad metadata 1006 received from the downstream control feed 1004. The ad queue database 1040 resides in long-term memory, such as a hard disk or flash memory. The system establishes a link that associates the ad metadata with the related advertisements (illustrated as lines between filtering 1008 and processing 1010).

The filtering 1008 determines whether an ad 1002 received from the downstream ad feed 1000 is appropriate for the household by comparing the target audience specified in the ad metadata 1006 with the viewer profiles from a profile database 1046. Ads that are not appropriate for viewers in this household will be discarded. The ad metadata 1006 will either be saved or discarded, depending upon whether the ad was saved or discarded. The processing 1010 manages the ad database 1014 and ad queue database 1018 by examining the contract limits from the ad metadata 1006 to determine when to purge ads and ad metadata from the associated databases. Additionally, the processing component 10101 updates the ad metadata 1006 based on ad delivery and user interaction.

A downstream data feed 1020 delivers television program/ content metadata 1022. This data 1022 includes the program content, language information, ratings, encoding attributes, networks and air times, delivery requirements, and pricing. The program metadata 1022 can be created by a number of parties including the program producer, media company, network operator, and broadband service provider. The set-top box can supplement this program metadata 1022 by adding presentation history and user interaction data.

The metadata 1022 is filtered and prepared 1024 and the prepared metadata 1026 is stored in metadata storage 1028. The filtering and preparing component 1024 makes a determination as to whether to store the program metadata based on the program air times, network services available by the household, and current system time. The metadata storage database 1028 stores program metadata received from the downstream data feed 1020. The metadata storage database 1028 resides in long-term memory, such as a hard disk or flash memory.

Note that the downstream data feed 1020, the filter and prepare metadata component 1024, and metadata storage 1028 can be replaced by an interface to an electronic program guide/interactive program guide (EPG/IPG) if the EPG/IPG allows access to the program metadata.

The user interface 628 supplies user events 1030 based on viewer interaction with the remote control and the front panel of the set-top box. These events 1030 include channel changes, volume changes, and VCR-like controls of the PVR. The filter events component 1032 examines the incoming event types and discards events not related to viewer profiling. Filtered events 1034 are time stamped based on the time that the event occurred and stored in an event queue 1036. The event queue 1036 stores the time stamped events 1034 in a sorted list. The event queue 1036 stores data from both the user interface 628 and a create/update profile component 1038.

The create/update profile component 1038 uses events from the user interface 628, program metadata from metadata storage 1028, and existing viewer profiles from a profile database 1046 to detect new viewing habits and characterize the current viewer. The create/update profile component 1040 generates internal events that are stored in the event queue 1032 along with the user interface events. These events indicate special future processing conditions such as the end of a program or change in day part. This component also performs maintenance on the profiles by combining similar profiles and deleting outdated profiles.

The profile database 1048 stores viewer profiles. New profiles are the result of a single viewing session. The create/update profile component 1052 can update a profile with additional viewing information. As a profile accumulates historical viewership data, it becomes a more accurate representation of the viewer. The predominant viewer profiles will accumulate the largest amount of viewing history. When determining whether to save ads in an ad database of limited size, those viewer profiles with the most viewing time will receive the most storage capacity for targeted ads.

When an ad insertion opportunity arises, the set-top box determines whether the current session profile matches any of the historical profiles in the profile database. If a match exists, the match will be used for selecting an appropriate advertisement. Otherwise, the set-top box uses the current session profile to select an appropriate advertisement. After presenting the ad to the viewer, the system updates the ad metadata and transmits an insertion report to the head-end.

Figure 11:
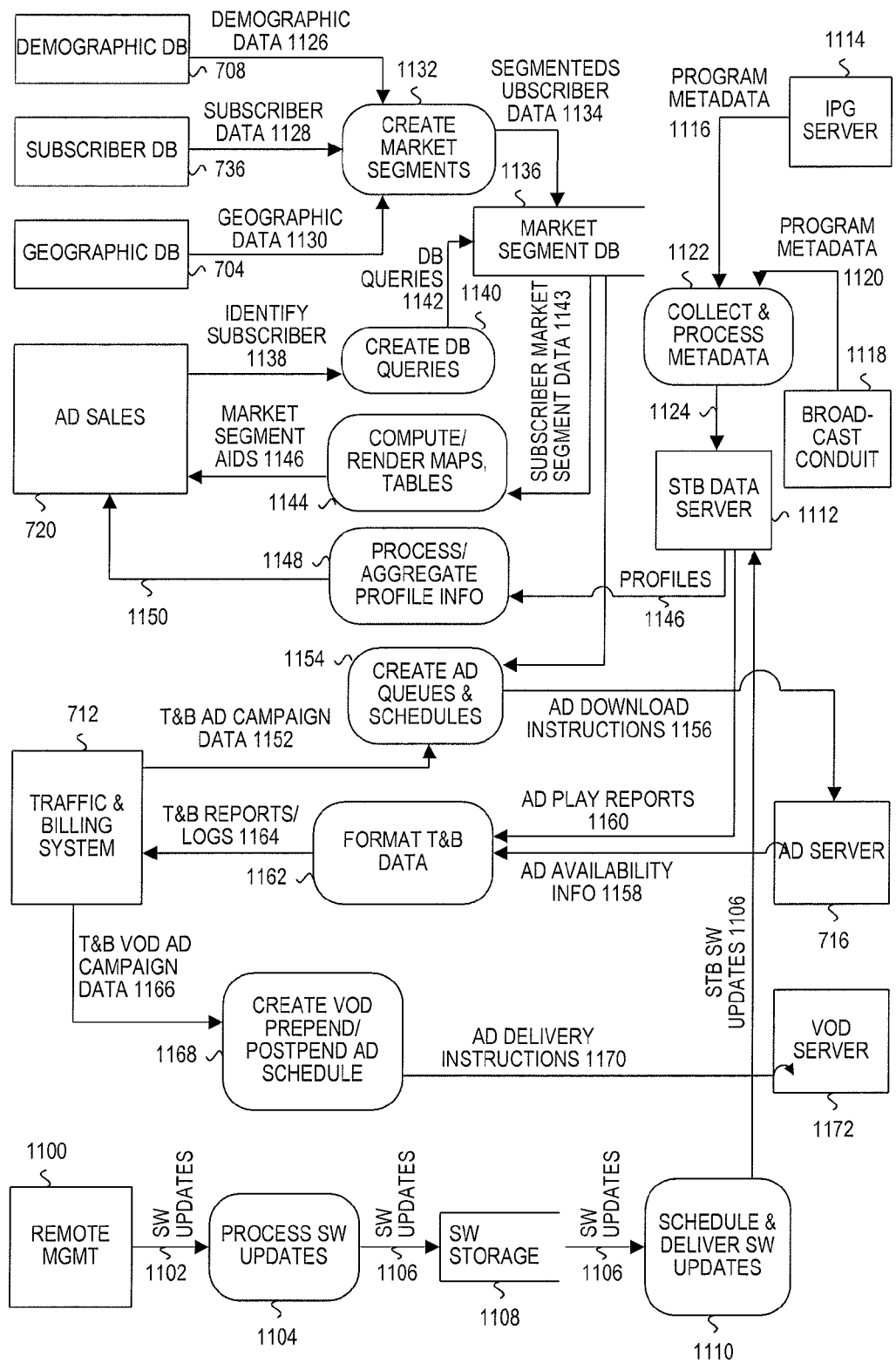
FIG. 11 illustrates an exemplary data flow in an ad management system designed to deliver targeted advertisements to a PVR-enabled set-top box.

FIG. 11 illustrates an exemplary data flow in an ad management system designed to deliver targeted advertisements to a PVR-enabled set-top box. This system includes different head-end servers that are used to segment the subscribers, deliver content and metadata to the set-top boxes, collect ad insertion results, and collect privacy protected summary data about the subscriber viewing habits. A remote manager 1100 provides a dynamic method of updating software and data files on the set-top box, including updating the viewer profiling and ad targeting applications. The remote manager 1100 delivers software updates 1102 that include application enhancements, defect corrections, and data file changes. The software updates are processed 1104 and the processed SW updates 1106 are stored in a storage device (SW storage) 1108. The processing 1104 includes accepting new software builds and the associated data files and determining the updates that need to be delivered to each group of set-top boxes based on network service requirements for that franchise and software build information. The updated software and support data files 1106 are maintained on the storage device until it is time to deliver them to the set-top boxes. The software updates 1106 are delivered in accordance with a schedule 1110. The schedule 1110 plans delivery of the updated software 1106 for periods of low television viewership. The software updates 1106 are sent to an STB data server 1112, which transmits the files to the appropriate set-top boxes.

An IPG Server 1114 delivers interactive program guide information in the form of program metadata 1116. A broadcast conduit 1118 receives program metadata from broadcasters and content providers and deliver the program metadata 1120. The program metadata (from both sources) 1116, 1120 is collected and processed 1122. The processing 1122 includes combining the program metadata from the different sources 1116, 1120 and formatting it for delivery to the set-top boxes. The program metadata 1116, 1120 includes program content, language information, ratings, encoding attributes, networks and air times, delivery requirements, and pricing. The formatted program metadata 1124 is sent to the STB data server 1112, which transmits it to the appropriate set-top boxes.

The demographic database 708 contains demographic data 1126 sorted by geographic region. The primary categories of demographic data 1126 include household income, household size, race/ethnicity, and occupation. In order to maintain the subscriber privacy, the database typically maintains data at either a zip+4 or block group level. The subscriber database 736 contains information about the service provider's subscribers 1128. For each subscriber, the database 736 must contain the node on which the household resides and the key to obtain demographic data for that subscriber. The database 736 does not need to maintain privacy related information such as the subscriber name and address. The geographic database 704 maintains detailed maps of the service provider region 1130. The system uses the geographic database 704 to help visualize the market segmentation of the service provider's region of coverage. Data from the demographic database 708, the subscriber database 736, and the geographic database 704 are combined in order to create 1132 market segments for each subscriber (i.e., segmented subscriber data 1134). The segmented subscriber data 1134 is stored in a market segment database 1136.

The ad sales application 720 assists the sales force in selling targeted spots to advertisers. The sales force identifies subscribers 1138 that it is interested in targeting ads to and creates 1140 DB queries 1142. The DB queries 1142 are applied to the market segment database 1136. The results of the queries (subscriber market segmentation data 1143) are used for computing tables and rendering maps 1144. The results of the computation (market segment aids 1146) are displayed to the advertiser (sales force) using the ad sales application 720. The market segment aids include display of market segment definitions, color coded market segment maps of the service provider coverage area, and ratings and pricing for targeted advertising based on network, spot time, and advertisement.

The STB Data Server 1112 generates viewer profiles 1146 based on historical data of television viewing habits (collected metadata). Although the raw data is not exported, the set-top box can summarize the data and transmit it upstream where it is processed and aggregated 1148 with similar information from other STBs. The process aggregates similar profiles to create a privacy-protected view of the households by region 1150. The ad sales application 720 uses this data 1150 to help determine the target audience of advertisements.

The traffic and billing system 712 manages the advertising campaign and controls advertising campaigns for broadcast systems, personal video recorders, and video on demand. The sales force enters requirements for viewership ratings, frequency of viewership by the target audience, and flight information, which indicates the networks and times for displaying the advertisement (ad campaign data 1152). Based on the defined ad campaign data 1152 and the market segment data 1143 from the market segment database 1136 an ad queue and schedule is created 1154. Based on the ad schedule 1154, ad download instructions 1156 are transmitted to the ad server 716. The ad server 716 determines the availability of the ads (ad availability information 1158) identified in the download instructions 1156. The ad server 716 transmits available ads and ad metadata to set-top boxes based on the ad schedule 1154. If the ads are displayed to the subscriber, the STB data server 1112 generates an ad play report 1160. The ad availability information 1158 and the ad play reports 1160 are formatted 1162 to create reports/logs 1164 that are forwarded to the T&B system 712. The traffic and billing system 712 bills the advertiser based on requirements satisfied during the campaign.

The T&B system 712 also allows the advertisers to create a VoD ad campaign 1166. Based on the ad campaign 1166 a prepend/postpend ad schedule component 1168 is created. Based on the schedule 1168, ad delivery instructions 1170 are transmitted to the VoD Server 1172. The VoD Server 1172 stores content to support the video-on-demand service. The VoD Server 1172 uses the ad delivery instructions 1170 to schedule the ads for display at the beginning and end of VoD content. The traffic and billing system 712 tracks the insertion results and bills the advertiser based on the insertions and contract requirements.

Referring back to FIG. 2, the alternative advertisements 230, 240 are displayed in place of or in conjunction with the fast forwarding, rewinding, skip or pausing advertisements 210, 220, when the subscriber fast forwards, rewinds, skips or pauses (trick play events) through the recorded advertisements 110, 120. As previously discussed, for ease and clarity fast forward will be focused on throughout this application. However, the invention is not limited thereto and in fact the current invention can be applied when any altering activity is performed on a recorded advertisement (trick-play events). In a preferred embodiment, the alternative advertisements 230, 240 are related to the recorded advertisements 110, 120 so that the advertisers are getting at least some value out of their advertisement even when the subscriber fast forwards through the advertisement. However, it is also possible that the alternative advertisements 230, 240 are not related to the recorded advertisements 110, 120, and may actually be an advertisement for a different product or service. The alternative advertisements 230, 240 may be a separate video (preferred for non-related advertisements) or may be derived from the video for the recorded advertisements 110, 120.

Figure 12A:
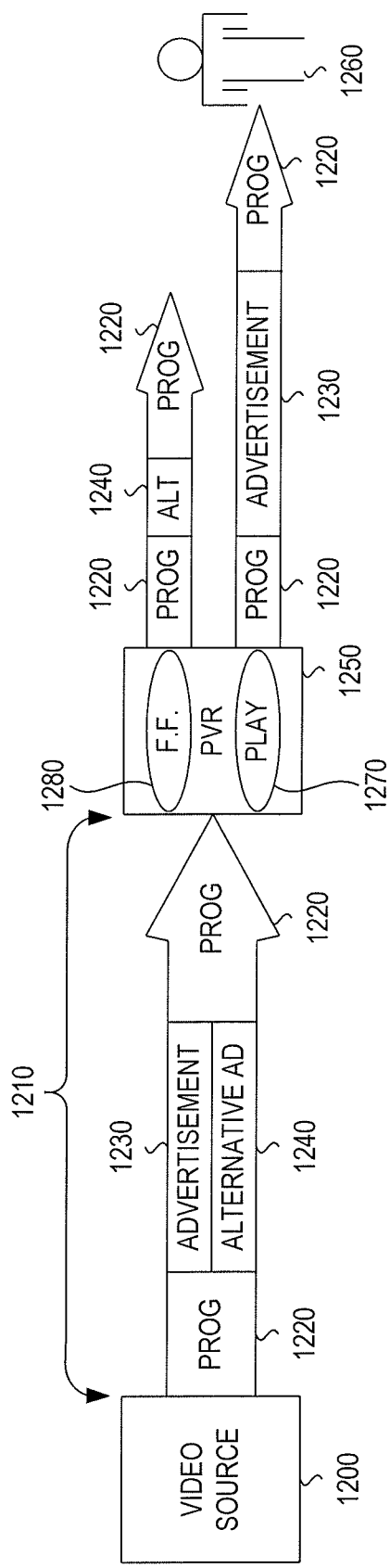
FIGS. 12A-B illustrate exemplary systems in which the alternative advertisements are received as separate files.
Figure 12B:
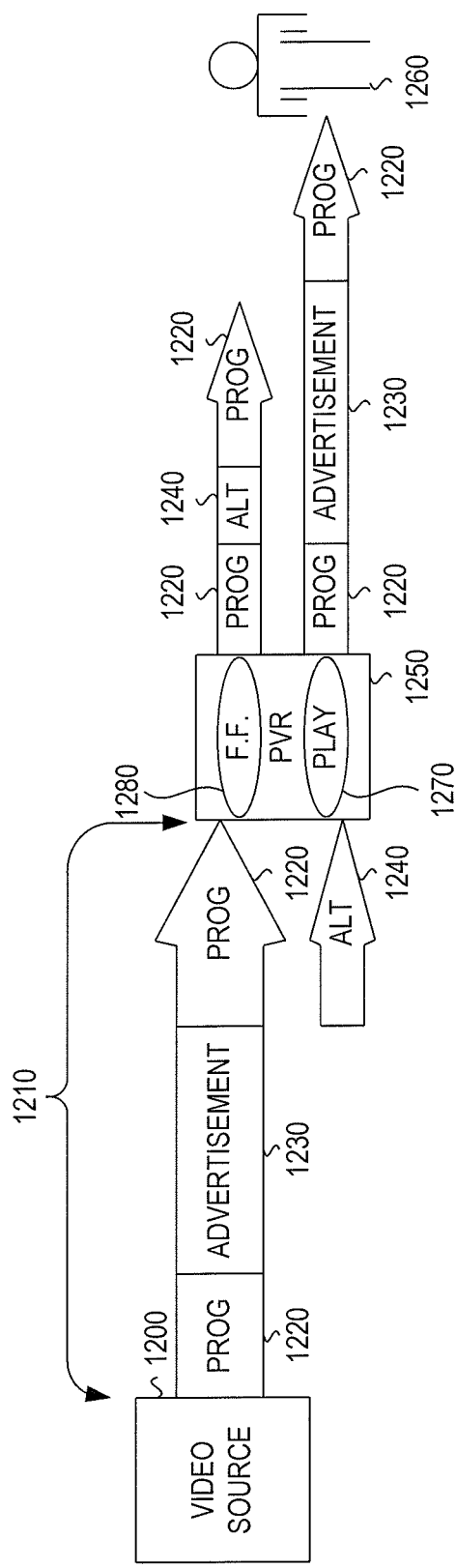

FIGS. 12A-B illustrate several exemplary embodiments associated with the alternative advertisement being a separate video (and thus potentially an alternative advertisement unrelated to the advertisement). FIG. 12A illustrates an embodiment where a program source (video source) 1200 transmits a program stream (video stream) 1210 including programming 1220 and both an advertisement 1230 and an alternative advertisement 1240 (in a preferred embodiment a related alternative ad) to a PVR 1250. The video source 1200 may be a satellite, a head-end, a networked video server, prerecorded video on a number of mediums, or other sources that would be well known to those of ordinary skill in the art. The PVR 1250 may be a HE PVR, a STB PVR, some combination of a HE/STB PVR, or some type of video source server (i.e., DVD). The video stream 1210 may be transmitted from the video source 1200 to the PVR 1250 using a video delivery system, such as those previously discussed.

In this embodiment, the advertisement 1230 and the alternative advertisement 1240 may be the same type (i.e., compressed digital video). For example, in a digital video environment, it is likely that the video would be compressed in accordance with a compression standard, such as MPEG-2 (the Moving Picture Experts Group system). ISO/IEC 13818 is the current standard for digital video broadcast and digital video disk and this standard is herein incorporate by reference in its entirety. However, as one skilled in the art would recognize, there are other standards for video compression now known or later discovered that could be used that would be well within the scope of the current invention including, but not limited to, MPEG-4 (ISO/IEC 14496 is the standard for multimedia for the fixed and mobile web applications and is herein incorporated by reference in its entirety), Microsoft® Windows Media Video, RealNetworks® RealVideo and On2 Technologies VP4. Alternatively, the alternative advertisement 1240 may have a different format than the advertisement 1230.

The PVR 1250 will display the advertisement 1230 to a subscriber 1260 if the video stream 1210 was either not recorded or if the advertisement 1230 within the video stream 1210 is played back at normal speed 1270. If the video stream was recorded and the subscriber 1260 fast forwards 1280 (or any other trick-play event) the advertisement 1230, the alternative advertisement 1240 will be displayed to the subscriber 1260. Displaying the alternative advertisement 1240 may be in place of or in conjunction with the fast forwarding advertisement 1230. In effect, the PVR 1250 is switching between the two different video advertisements (advertisement 1230 and alternative advertisement 1240) that were received within the video stream 1210.

As one skilled in the art knows, the audio associated with advertisements may be transported along with the advertisements or may be transmitted as a separate file from the advertisements. As illustrated, there is no separate audio for the advertisement 1230 or the alternative advertisement 1240 indicating that the audio was transported along with the appropriate advertisement (or that no audio is associated with the ads). However, it should be noted that there could be a separate audio stream (not illustrated) for each of the advertisements (ad 1230 and alternative ad 1240) within the program stream 1210. In either event, the PVR 1250 plays the audio associated with the selected advertisement (advertisement 1230 for play 1270 and alternative ad 1240 for fast forward 1280). The playing of audio with the alternative ad advantageous. The alternative audio can be a sequence of musical notes or any other appropriate audio message such as the name of the manufacturer or a sound associated with the manufacturer or product. In an alternative embodiment, there is either no audio for the alternative ad 1240 or the audio is a generic audio (i.e., sound, tone, jingle).

It should be noted that the advertisement 1230 and the alternative advertisement 1240 may be default advertisements (everybody connected to that video delivery system receives the same advertisement) or they may be targeted advertisements. The advertisements may be targeted based on geodemographics (i.e., node or cluster of nodes), household (i.e., STB PVR), or individual (session based). The targeting of ads is described in applicants' applications U.S. patent application Ser. No. 09/635,544; U.S. patent application Ser. No. 09/998,979 (now U.S. Pat. No. 7,260,823); U.S. Provisional Application 60/278,612; U.S. patent application Ser. No. 09/928,024 and WO/01/25261. Depending on the criteria used to target the advertisements 1230 and alternative advertisements 1240, it is possible for different nodes, households or subscribers 1260 to receive the same targeted advertisement 1230 but different targeted alternative advertisements 1240.

According to one embodiment, the video stream 1210 may include multiple alternative advertisements 1240, and the PVR 1250 determines which alternative advertisement 1240 to display to the subscriber 1260 based on which subscriber 1260 (individual subscriber or group of subscribers) the PVR 1250 determines is interacting with (i.e., viewing) the video stream 1210. That is, the alternative advertisement 1240 is targeted to the subscriber 1260 (regardless of whether the advertisement 1230 was a default ad or was targeted). It should be noted that a system for determining who is likely to be viewing the programming may be incorporated into the PVR 1250, may be a separate system that provides the results to the PVR 1250, or some combination or iteration thereof. Applicant's applications U.S. patent application Ser. No. 09/204,888 (now U.S. Pat. No. 7,150,030); WO/99/33160; U.S. patent application Ser. No. 09/516,983 (now U.S. Pat. No. 7,240,355); U.S. patent application Ser. No. 12/871,526; U.S. patent application Ser. No. 09/591,577 (now U.S. Pat. No. 7,949,565); U.S. patent application Ser. No. 09/635,252; U.S. patent application Ser. No. 09/205,653 (now U.S. Pat. No. 6,457,010); U.S. patent application Ser. No. 09/452,893 9 (now U.S. Pat. No. 6,684,194; WO 00/33233; and U.S. patent application Ser. No. 09/998,979 (now U.S. Pat. No. 7,260,832) describe in more detail systems for profiling subscribers based on their interactions with the TV, and possibly other data that can be gathered about the subscribers, and for identifying the subscribers by comparing current interactions to the generated profiles.

FIG. 12B illustrates an exemplary embodiment in which the alternative advertisement 1240 is not received within the video stream 1210 but is received separately. The alternative advertisement 1240 may be received from the same video source 1200, a media buyer, directly from an advertiser, or from other external sources that would be known to those skilled in the art. The alternative advertisement 1240 may be delivered via the same video delivery network as the video stream 1210 (i.e., via an ad channel) or may be delivered via a different network, such as the Internet. The alternative advertisement 1240 may have a format similar (i.e., MPEG-2) to that of the advertisement 1230, or it may have a separate format, such as HTML, streaming media, Flash, Shockwave, or other formats well known to those skilled in the art. As previously discussed, the advertisements 1230 and the alternative advertisements 1240 may be default ads or may be targeted ads.

The alternative advertisement 1240 may be delivered to the PVR 1250 in order to be received at the same time (or close proximity) to the advertisement 1230 or may be delivered at completely separate times, such as during off hours. In any event, the PVR 1250 needs to associate the alternative advertisement 1240 and the advertisement 1230 so that it can deliver the appropriate advertisement (advertisement 1230 or alternative advertisement 1240) to the subscriber 1260 based on the mode (play 1270 or fast forward 1280) of playback. According to one embodiment, the alternative advertisement 1240 received by and stored on the PVR 1250 may be nothing more than a URL address. If the subscriber 1260 fast forwards 1280 through the advertisement 1230, the PVR 1250 will deliver the contents of the URL to the subscriber 1260. Regardless of the format of the alternative advertisement 1240, it may be displayed in place of the fast forwarding advertisement 1230 or in conjunction with the fast forwarding advertisement 1230.

As illustrated, there is no separate audio for the advertisement 1230 or the alternative advertisement 1240 indicating that the audio was transported along with the appropriate advertisement. However, there could be a separate audio stream (not illustrated) for the advertisement 1230 within the program stream or for the alternative ad 1240 received separately. Moreover, the audio associated with the ad 1230 could be received separately (not within the program stream). Furthermore, the audio associated with the alt ad 1240 (which is received separately) could be received within the program stream 1210. In any event, the PVR 1250 either plays the audio associated with the selected advertisement (1230 or 1240), no audio or a standard audio.

According to one embodiment, multiple alternative advertisements 1240 are delivered to the PVR 1250 and stored thereon. Each of the alternative ads 1240 received by the PVR 1250 must be associated with the appropriate advertisement 1230. The PVR 1250 determines which subscriber 1260 (individual or group) is viewing the video stream 1210 and displays the appropriate alternative advertisement 1240 (in place of or in conjunction with the fast forwarding advertisement 1230) when the subscriber 1260 fast forwards 1280 through the recorded advertisement 1230. As previously discussed, the determination of which subscriber is interacting with the TV (i.e., viewing the video stream 1210) may be done by profiling the subscribers based on their interactions.

Figure 13A:
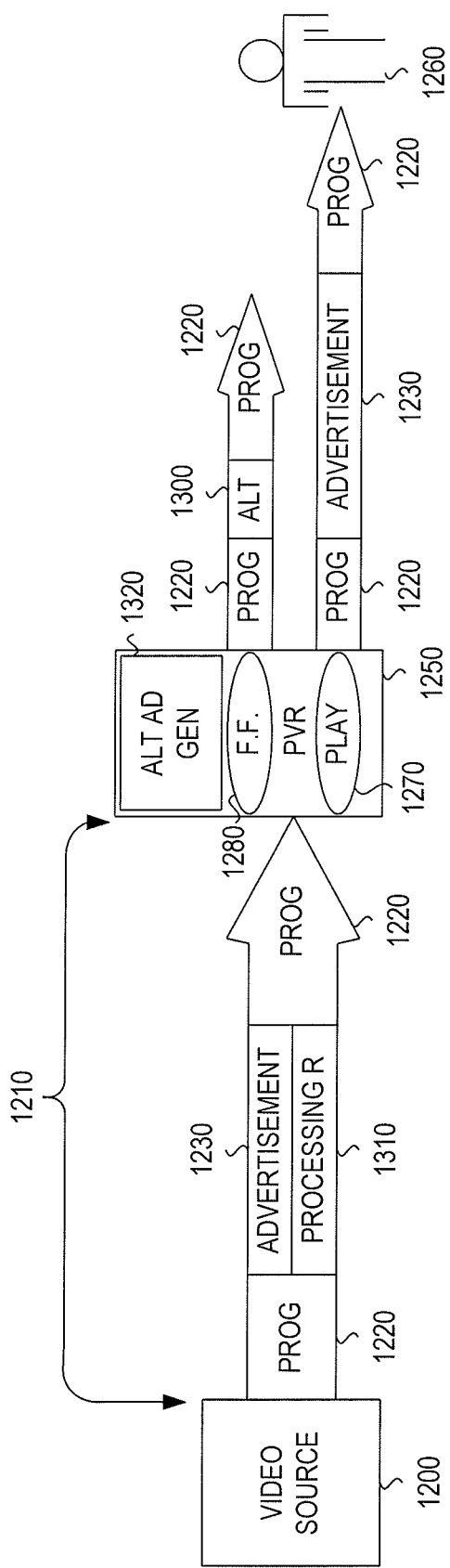
FIGS. 13A-C illustrate exemplary systems in which processing rules are received in order to generate alternative advertisements by applying the processing rules to advertisements.
Figure 13B:
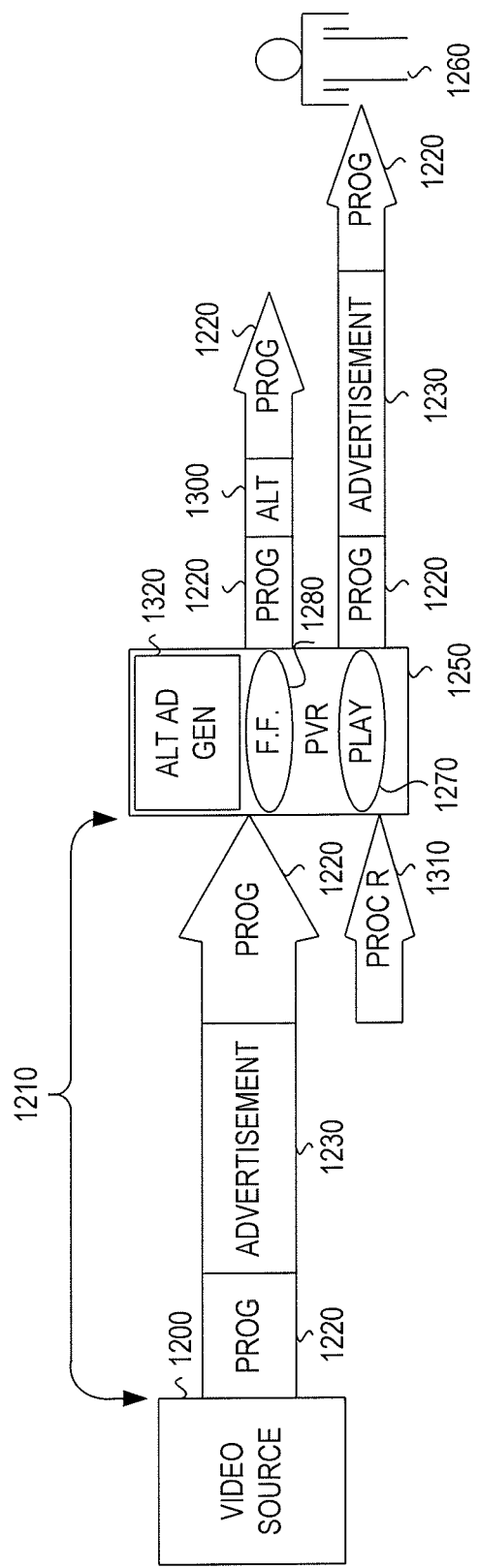
Figure 13C:
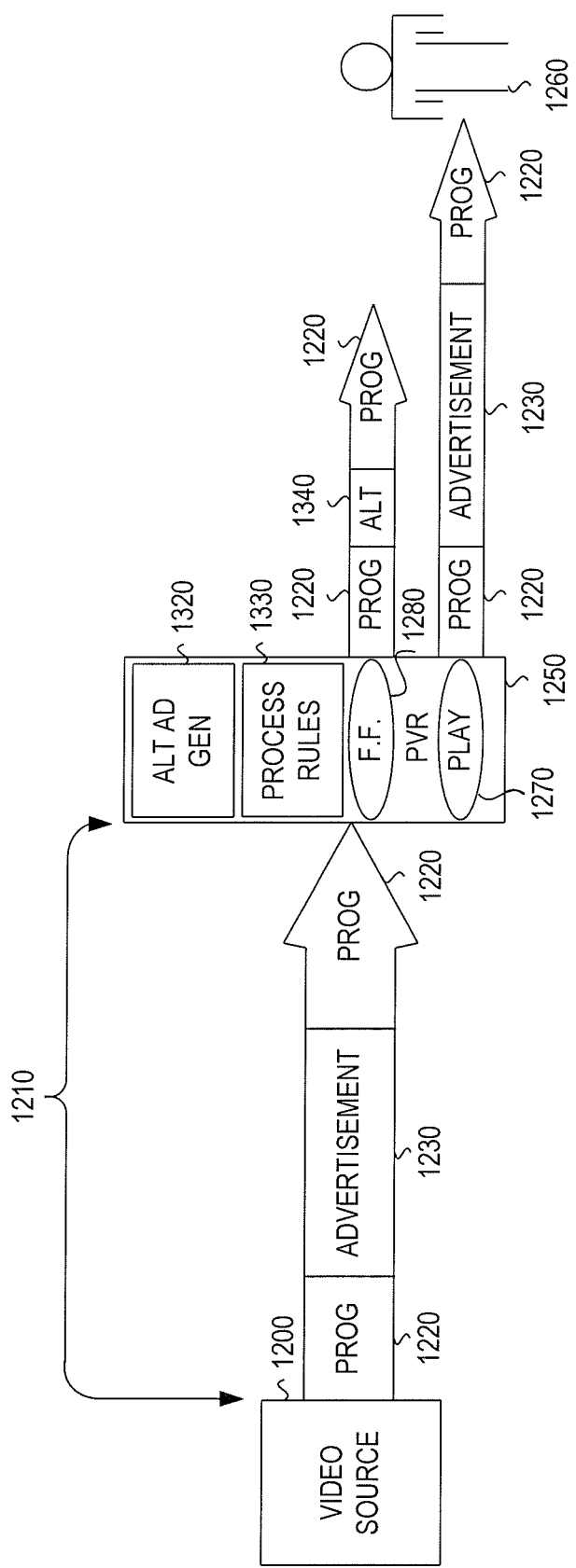

FIGS. 13A-C illustrate several exemplary embodiments associated with an alternative advertisement 1300 being derived from the advertisement 1230 by utilizing processing rules 1310. FIG. 13A illustrates an embodiment where the video source 1200 transmits the video stream 1210 including programming 1220 and both the advertisement 1230 (default or targeted) and the processing rules 1310 (i.e., data file) to the PVR 1250. The processing rules 1310 will be described in more detail later. The PVR 1250 may include an alternative ad generator 1320 that generates the alternative ad 1300 by applying the processing rules 1310 to the advertisement 1230. Based on whether the subscriber 1260 is fast forwarding 1280 through the advertisement 1230 or playing the advertisement 1230 at regular speed 1270 determines whether the alternative advertisement 1300 (either alone or in conjunction with the fast forwarding advertisement 1230) or the advertisement 1230 is displayed to the subscriber 1260.

The alternative ad generator 1320 may generate the alternative ad 1300 for each ad 1230 that is received, may generate the alternative ad 1300 for each ad 1230 that is recorded, or may generate the alternative ad 1300 on the fly for those ads 1230 that are being fast forwarded 1280 through. If the alternative ads 1300 are generated in advance of when they would be displayed (i.e., for each ad or for each recorded ad), the alternative ads 1300 would be stored within the PVR 1250 until they are required. The alternative ads 1300 could be purged as soon as they are played, after the corresponding ad 1230 is played and not recorded, at some predefined time interval (i.e., after a week), after the recorded ad 1230 was played, after the recorded ad 1230 is purged from the PVR 1250, or other scenarios that would be obvious to those of ordinary skill in the art.

As illustrated, there is no separate audio or separate audio processing rules indicating that the audio was transported along with the advertisement 1230 and the processing rules 1310 covered both the video and the audio. However, as previously noted there could be a separate audio stream (not illustrated) for the advertisement 1230 within the program stream 1210. Moreover, there could be a separate audio file associated with what will become the alternative advertisement 1300 within the program stream 1210 (with ad 1230 or as separate file). In fact, receiving a separate audio file for the alternative advertisement (regardless of how it is received) is preferred as manipulation of, for example, a 30 second audio track to produce a 2 second alternative audio track is not simple. In another embodiment, a second set of processing rules may be received for the audio. In any event, the PVR 1250 plays either the audio associated with the selected advertisement (1230 or 1240), a standard audio or no audio.

According to one embodiment, the processing rules 1310 may actually consist of multiple sets of processing rules 1310 with each set describing a different way to modify the advertisement 1230. The alternative advertisement 1300 is created based on who the PVR 1250 determines is watching the video stream 1210 an applying the appropriate set of processing rules 1310. That is, the alternative advertisement 1300 may be customized (targeted) to the subscriber 1260 (individual subscriber or group of subscribers) that is determined to be viewing the video stream 1210 (regardless of whether the advertisement 1230 was a default or was targeted). A system for determining who is likely to be viewing the TV (i.e., the video stream 1210) has previously been discussed.

Multiple alternative advertisements 1300 may be made by applying each set of processing rules 1310 for each advertisement 1230 that is: recorded, played back, or fast forwarded during playback. Alternatively, only the set of processing rules 1310 associated with the appropriate subscriber 1260 are applied so that only targeted alternative advertisements 1300 are generated for the current subscriber 1260 when the associated advertisement 1230 is: recorded, played back, or fast forwarded during playback. In either event, if alternative advertisements 1300 are created prior to the fast forwarding event 1280 they will need to be stored on the PVR 1260 and then purged at the appropriate time (i.e., after a certain time, after playback, after ad 1230 is purged).

The different sets of processing rules 1310 are likely based on different viewing preferences of the subscriber 1260. For example, processing rules 1310 for a subscriber 1260 whose viewing preferences indicate that they do not to like a lot of action in their program choices may be to simply select an individual image from the advertisement 1230 and display it for the length of the alternative advertisement 1300 (i.e., 2 seconds). Application of this processing rule 1310 would generate an alternative ad 1300 that was a still image. Alternatively, processing rules 1310 for a subscriber 1260 whose viewing preferences was quick changing action may be to select several images and display each of them for a certain time (i.e., four images each for a half-second for the two second alternative ad 1300). Other processing rules 1310 may be to display a certain portion of the advertisement 1230 (i.e., first two seconds, last two seconds).

FIG. 13B illustrates an exemplary embodiment in which the processing rules 1310 are not received within the video stream 1210 but are received separately. The processing rules 1310 may be received from the same video source 1200, a media buyer, directly from an advertiser, or from other external sources that would be known to those skilled in the art. The processing rules 1310 may be delivered via the same video delivery network as the video stream 1210 or may be delivered via a separate network, such as the Internet. The processing rules 1310 may be delivered to the PVR 1250 in order to be received at the same time (or close proximity) to the advertisement 1230 or may be delivered at completely separate times, such as during off hours. In any event, the PVR 1250 needs to associate the processing rules 1310 and the advertisement 1230 so that it can generate the alternative advertisement 1300. The alternative ads 1300 may be generated prior to a fast forward event 1280 and stored on the PVR 1250 or may be generated on the fly as the fast forward event 1280 occurs.

As illustrated, there is no separate audio or separate audio processing rules indicating they were included in the advertisement 1230 and the processing rules 1310 respectively. However, as previously noted there could be a separate audio stream (not illustrated) for the advertisement 1230 within the program stream 1210 or received separately. Moreover, in a preferred embodiment there could be a separate audio file (alternative audio) associated with what will become the alternative advertisement 1300. The alternative audio could be received within the program stream 1210 (with ad 1230 or as separate file) or received separately (i.e., ad channel or Internet connection). In another embodiment, a second set of processing rules may be received for the audio. In any event, the PVR 1250 either plays the audio associated with the selected advertisement (1230 or 1240), no audio, or standard audio.

According to one embodiment, multiple sets of processing rules 1310 (each set describing a different way to modify the advertisement 1230) are delivered to the PVR 1250 and stored thereon. Each set of processing rules 1310 received by the PVR 1250 must be associated with the appropriate advertisement 1230. The PVR 1250 may generate multiple alternative ads 1300 based on the advertisement 1230 and the different sets of rules 1310, or may only generate the alternative advertisement 1300 associated with the current subscriber 1260. The alternative ads 1300 may be generated in advance (before the fast forward event) or on the fly (during the fast forward event).

FIG. 13C illustrates an exemplary embodiment in which processing rules 1330 are already stored on the PVR 1250 and are thus not related to the specific ads 1230. The processing rules 1330 contained on the PVR 1250 may have been preloaded at time of purchase or installation, may have been created by the subscriber 1260, may have been created by the network operator and loaded onto the PVR 1250 via the video delivery network or via a separate connection, such as the Internet. In this embodiment, there are no alternative advertisements 1240 or processing rules 1310 associated with the advertisements 1230 delivered to the PVR 1250 via any means. Rather the processing rules 1330 will be generic and the advertisements 1230 will have to somewhat follow a format associated with the processing rules 1330 so that alternative advertisements 1340 can be created by applying the processing rules 1330 to any advertisement 1230.

As illustrated, there is no separate audio processing rules thus indicating the processing rules 1310 cover audio as well. However, there could be a second set of processing rules for the audio. As the processing rules stored on the PVR are likely generic, the audio would have to be formatted to work with the generic rules (for example, the processing rules may define using the first two seconds of audio so the first two seconds of the audio would have to be what the advertiser wanted played during an alternative ad). According to one embodiment, either no audio or standard audio is played during the alternative advertisement. In another embodiment, a separate audio file (alternative audio) associated with what will become the alternative advertisement 1340 is received. The alternative audio could be received within the program stream 1210 (with ad 1230 or as separate file) or received separately (i.e., ad channel or Internet connection).

According to one embodiment, multiple processing rules 1330 may exist on the PVR 1250, with each processing rule 1330 being associated with one or more subscribers 1260 (individual or group) that may be viewing the video stream.

The PVR 1250 may develop an alternative ad 1340 for each set of processing rules 1330 or simply for the processing rules 1330 associated with the current subscriber 1260. The processing rules 1330 may be applied in advance and the alternative ad 1340 thus stored on the PVR 1250, or may be generated as the recorded advertisement 1230 is fast forwarded 1280 (on the fly).

Figure 14A:
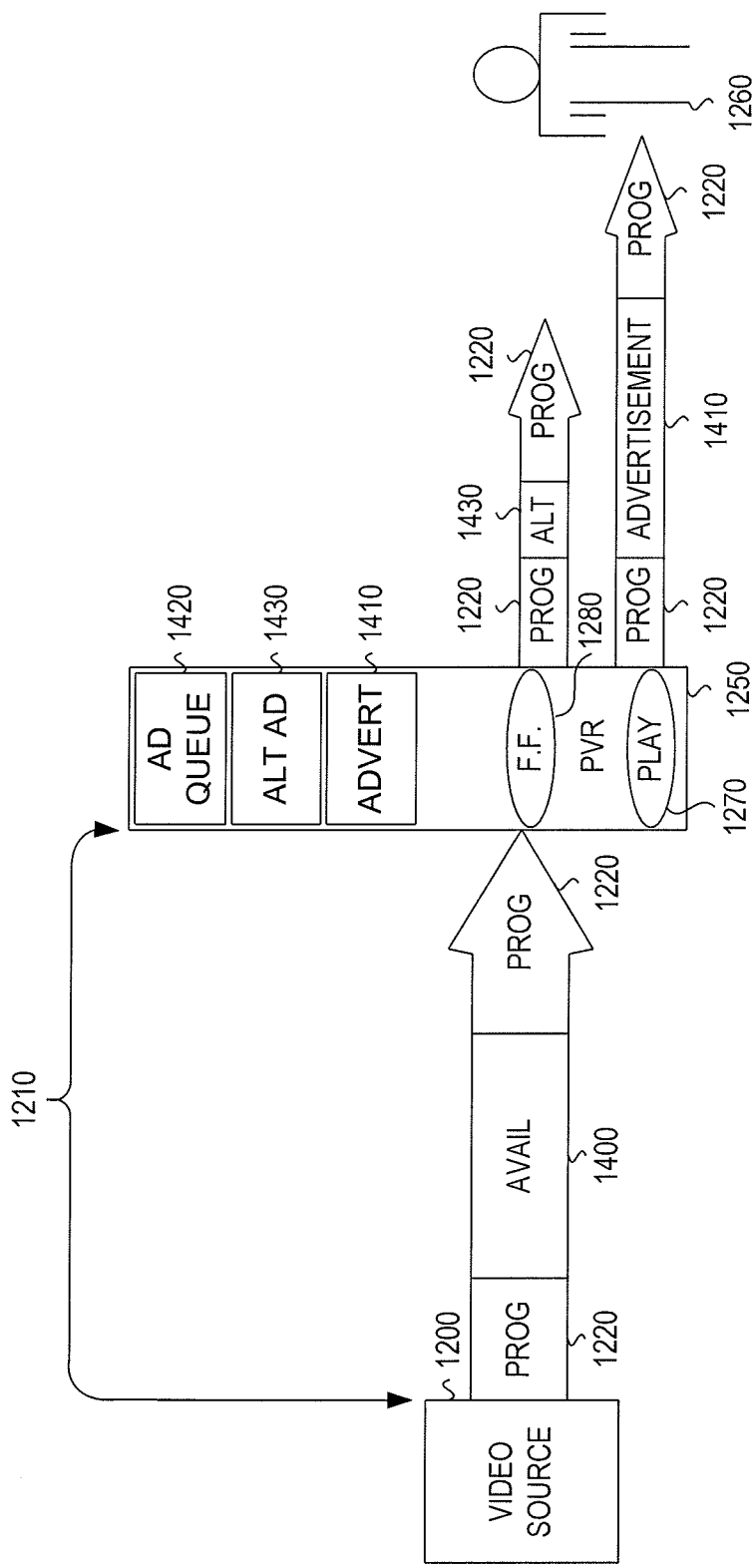
FIGS. 14A-B illustrate exemplary systems in which advertisements and an ad queue are utilized along with alternative advertisements and/or processing rules.
Figure 14B:
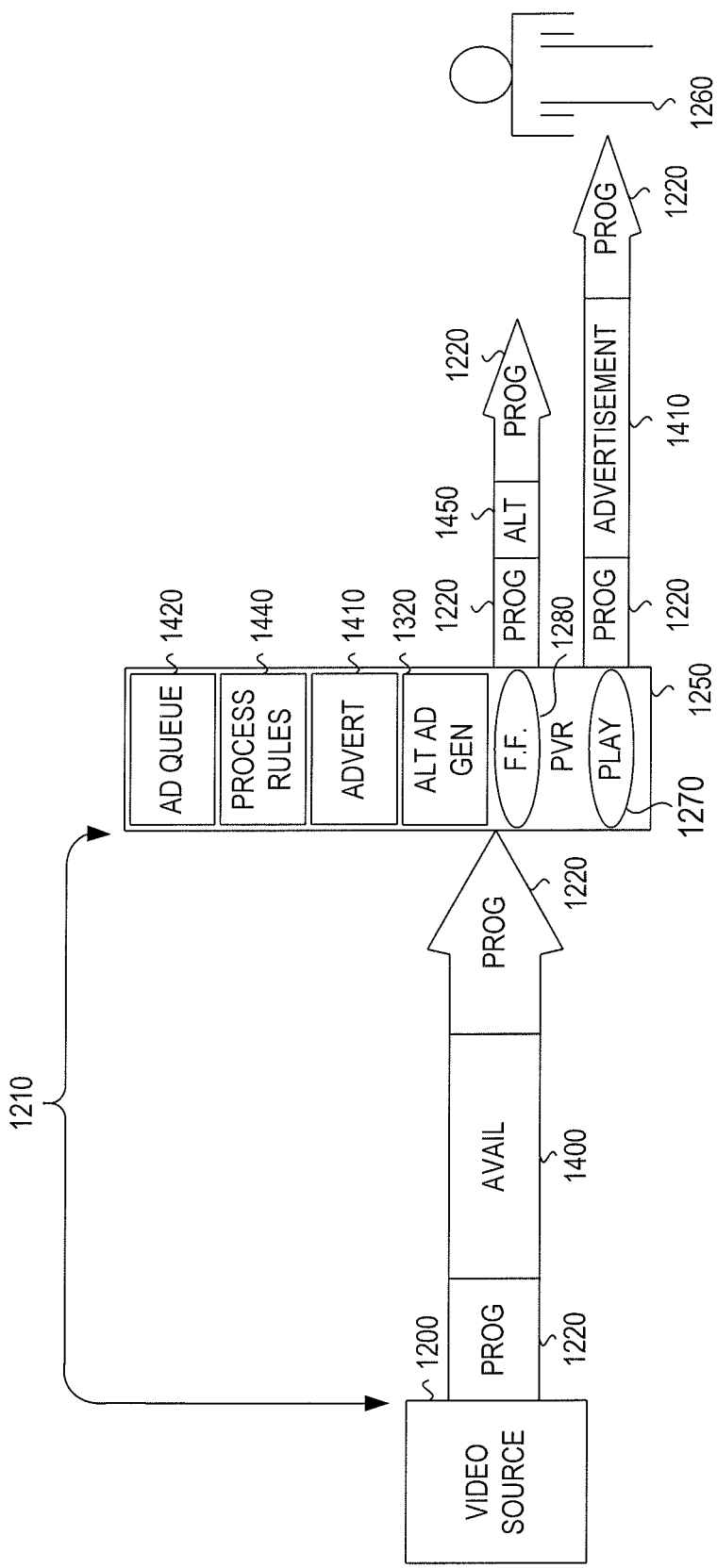

FIGS. 14A-B illustrate several exemplary embodiments where advertisements 1410 (in a preferred embodiment targeted advertisements) and an ad queue 1420 are stored on the PVR 1250. The video stream 1210 from the video server 1200 includes avails 1400 (either blank avails or avails with default ads available for replacement with targeted ads). The PVR 1250 inserts the ads 1410 in the avails 1400 based on the ad queue 1420. The ad queue 1420 is a list of the next ads 1410 that should be inserted. The ad queue 1420 may vary based on what subscriber 1260 is interacting with the TV, what time of day it is, what day of the week, what programs are on, and other criteria that would be well within the scope of the current invention. Applicants applications U.S. patent application Ser. No. 09/712,790 (now U.S. Pat. No. 8,151,295), U.S. patent application Ser. No. 09/742,534 (now U.S. Pat. No. 7,039,932) and U.S. patent application Ser. No. 09/742,852 describe ad queues in more detail.

It should be noted that the ad queue 1420 provides a pointer, which may be in the form of an ad resource locator (ARL), to the ads 1410 that are to be inserted. The ad queue 1420 points to the location of the ads 1410 within the PVR 1250. However, the invention is in no way intended to be limited thereto. Rather, the ads 1410 may be stored externally (i.e., on a separate storage device, by the advertiser or media buyer) and delivered to the PVR 1250 when the ad queue 1420 determines it is appropriate. If stored externally, the ads 1410 may be delivered to the PVR 1250 in advance of the insertion of the ad 1410 (i.e., when the ad queue 1420 identifies the ad 1410 as the next ad to be inserted) or at the time of insertion. The ads 1410 may be delivered via the video delivery network or via an external connection, such as the Internet.

FIG. 14A illustrates an exemplary embodiment, in which alternative ads 1430 are also stored on the PVR 1250. In a preferred embodiment, the alternative ads 1430 are related to the ads 1410. However, the invention is not limited thereto, as alternative embodiments may have alternative ads 1430 that are not related to the ads 1410. If the subscriber 1260 fast forwards 1280 through an advertisement 1410 that was inserted in the video stream 1210 and recorded by the PVR 1250, then the PVR 1250 displays the alternative ad 1430 (either in place of or in conjunction with the advertisement 1410). As previously noted, the alternative ads 1430 may have a format different than the format of the ad 1410. For example, the ad 1410 may be in MPEG format while the alternative ad 1430 may be HTML, Flash, Shockwave, streaming media or other formats.

If the alternative ads 1430 are related to ads 1410, there will have to be a link between the two so that the PVR 1250 knows which alternative ad 1430 to display if the ad 1410 is fast forwarded 1280. If the alternative ads 1430 are not related to the ads 1410, then a separate queue may be maintained for the alternative ads. The separate queue may be a subset of the ad queue 1420 or may be a completely separate queue.

There is no audio illustrated indicating that it is part of the advertisements 1410 and alternative advertisements 1430. However, the audio for each of the advertisements could be stored separately. If the audio was separate the audio and video would be linked in a preferred embodiment.

According to one embodiment, there may be several alternative ads 1430 for each ad 1410, with the appropriate alternative ad being selected based on which subscriber 1260 (individual or group) is interacting with the video programming 1210.

As illustrated, the ads 1410, ad queue 1420 and alternative ads 1430 are separate, possibly indicating that there are separate memory devices for each of these. The current invention covers any implementation of memory that may be used to capture this data, including a separate memory device for each, or a single memory device that contains all the data but is partitioned in some fashion. As one skilled in the art would recognize, the memory could be RAM, a hard drive, a CD, a memory stick or any other types of memory that would be obvious to one of ordinary skill in the art. Moreover, it should be noted that the alternative ads 1430 may also be stored external to the PVR 1250.

FIG. 14B illustrates an exemplary embodiment, in which processing rules 1440 are stored on the PVR 1250. The processing rules 1440 may be associated with the ads 1410 or may be general processing rules. The PVR 1250 may generate alternative ads 1450 in advance of when they are needed or on the fly when the fast forward event occurs. If the subscriber 1260 fast forwards through a recorded advertisement 1410, then the PVR 1250 displays the alternative ad 1450 (either in place of or in conjunction with the advertisement 1410). As would be obvious to one of ordinary skill in the art, the processing rules 1440 may also be stored external to the PVR 1250. According to one embodiment, there may be several processing rules 1440 for each ad 1410, with the appropriate processing rules 1440 being applied to generate the appropriate alternative ad 1450 based on which subscriber 1260 (individual or group) is interacting with the video programming 1210.

There is no separate audio or separate audio processing rules illustrated indicating that the audio is part of the advertisements 1410 and the audio processing rules are part of the processing rules 1440. However, the audio for each of the advertisements 1410 and the audio processing rules could be stored separately. Furthermore, separate audio files could be stored for what will become the alternative ads 1450. Alternatively, there may be no audio or generic audio (i.e., tone) associated with the alternative ads.

It should be noted that the exemplary embodiments discussed in relation to FIGS. 12-14 may be combined in different fashions without departing from the scope of the current invention. For example, the PVR may be able to receive alternative ads (related and non-related) and associated alternative audio, and processing rules (for both audio and video) via both the video delivery network and the alternative connection, as well as store ads (targeted and non-targeted), alternative ads (targeted, non-targeted, related and non-related) and processing rules thereon.

Figure 15:
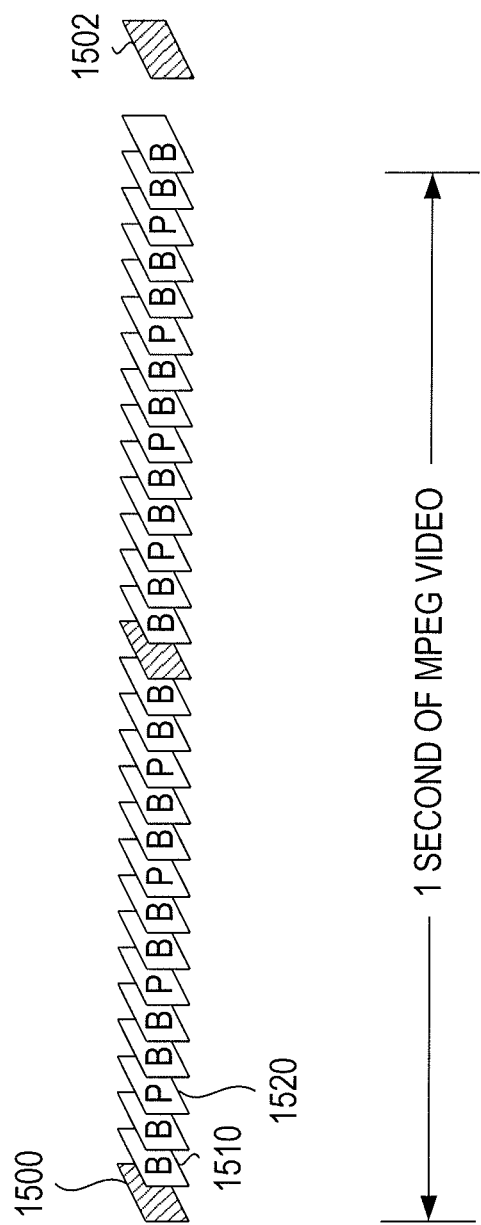
FIG. 15 illustrates an exemplary one-second MPEG data stream.

Before discussing in detail how the processing rules generate an alternative ad (video) from a standard advertisement, an exemplary overview of MPEG coding is provided in FIG. 15 that illustrates an exemplary one second of an MPEG stream. As would be obvious to one of ordinary skill in the art, an MPEG stream consists of three separate type of frames, I-frames 1500, P-frames 1510 and B-frames 1520. The I-frames 1500 are compressed (or coded) using only information within the frame (called intra-frame coding), the P-frames 1510 are compressed using information within the frame as well as information from the previous I or P frame (called inter-frame or predictive coding) and the B-frames 1520 are compressed using information within the frame as well as information from the previous I or P frame and from the next I or P frame (called bi-directional inter-frame or predictive coding). As illustrated, there is an I-frame 1500 every 15$^{th}$ frame. As one of ordinary skill in the art would recognize, I frames may have any arbitrary spacing, or may not be present at all. For example, I-frames may be repeated at different intervals, such as every 3$^{rd}$ (IBBI), 6$^{th}$ (IBBPBBI), 9$^{th}$ (IBBPBBPBBPBBI), 12$^{th}$, 15$^{th}$, 18$^{th}$, and so on frames. Common practice (striking a compromise between good compression and rapid access), though dictates typical I-frame intervals of 12 or 15 frames.

As previously mentioned, the processing rules may be specific to the advertisement or may be generic in nature. The processing rules may state which frames from the advertisement to use to create the trick play ad. As one skilled in the art would recognize, processing rules specific to the advertisement could be much more elaborate than generic processing rules. That is, the generic rules may simply specify a single frame to display (i.e., first I-Frame), or a particular segment of video (i.e., first 2 seconds), or simple combinations of the above (i.e., first and second I-frames; first I-frame for 1 second followed by 1 second of video). The specific processing rules could identify exact frames, sets of frames, segments of video, and any complex combination thereof (i.e., 3$^{rd}$ I-Frame for ½ second, followed by segment of video between 21$^{st}$ and 22$^{nd}$ second of ad, followed by 1$^{st}$ I-frame for ½ second). In addition, the processing rules could also define editing of the various frames or video segments (i.e., cropping; changing video features such as color, tint, hue, contrast; adding computer generated graphics; displaying different frames at the same time (i.e., one on top and one on bottom); using one frame as the background for video segments being run in front of the frame).

As previously mentioned, there may be multiple sets of processing rules defined for each advertisement (specific rules) or for each subscriber (generic rules). The different sets of rules could create different advertisements based on who was determined to be viewing the programming.

According to one embodiment, the frames or segments of video that make up the advertisement may be flagged with some type of designations. This flagging may be performed when the advertisement is generated or anytime after ad production. The flagging of the frames may be done in numerous methods known to those of ordinary skill in the art, including but not limited to user data embedded in the compressed video stream (as defined, for example in the MPEG-2 video specification—ISO/IEC 13818-2 which is herein incorporated by reference), or as a separate packetized data steam associated and synchronized with a specific program (as defined, for example, in the MPEG-2 systems specification—ISO/IEC 13818-1 which is herein incorporated by reference), or as a separate data file that provides pointers to flagged frames in the advertisement. If the advertisement is flagged in some fashion, the processing rules could rely on the flagging in order to generate the alternative advertisement. Additionally, the flagging could be used to customize (target) the alternative advertisement to the subscriber that is determined to be interacting with the program stream. As should be obvious, the generic processing rules associated with flagged advertisements are much more simple than processing rules that would be associated with the advertisement.

Exemplary specific processing rules for flagged advertisements may include: display all the video that is flagged in a certain fashion (i.e., designated with a 1); add computer-generated graphics to all frames flagged with a 2, crop the frames flagged with a 3. Exemplary generic processing rules for flagged advertisements may include: display all the video that is flagged with a 1. There are multiple generic and specific rules that would be well within the scope of the current invention.

Figure 16A:
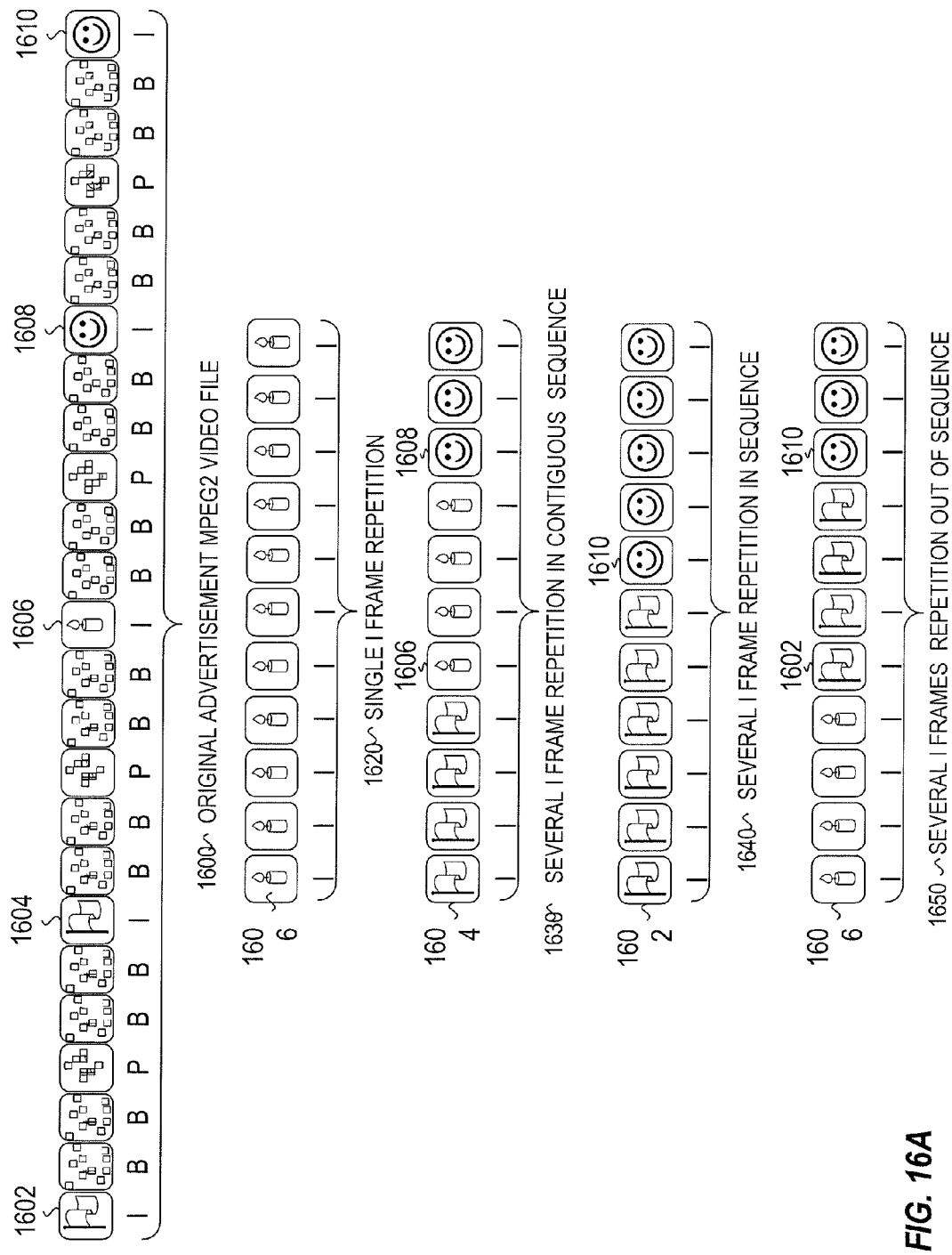
FIGS. 16A-C illustrate exemplary alternative advertisements being produced from an original advertisement.
Figure 16B:
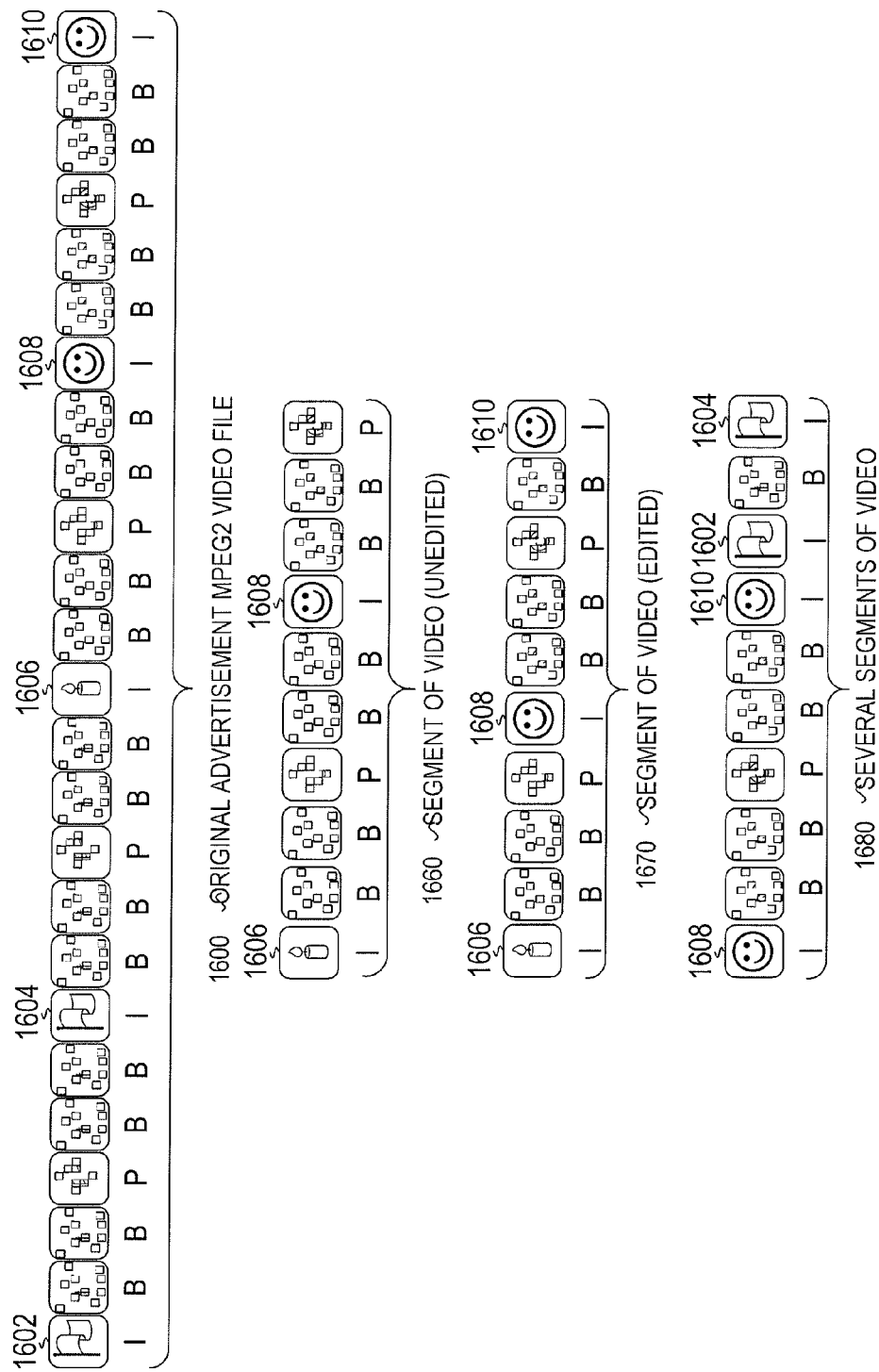

FIGS. 16A-B illustrate an exemplary advertisement in MPEG format and several exemplary alternative advertisements that can be created therefrom. As illustrated, the exemplary advertisement 1600 has an I-frame every 6$^{th}$ frame. That is, the 1$^{st}$ I frame is the 1$^{st}$ frame 1602, the second I frame is the 7$^{th}$ frame 1604, the 3$^{rd}$ I frame is the 13$^{th}$ frame 1606, the 4$^{th}$ I frame is the 19$^{th}$ frame 1608, and the 5$^{th}$ I frame is the 25$^{th}$ frame 1610. The processing rules used to generate the alternative ads may have been specific to the advertisement 1600 or general in nature, and the advertisement 1600 may be flagged in some fashion or not. An important aspect of the processing rules as shown in the exemplary alternative advertisements in FIGS. 16A-B, is the preservation of inter-frame coding relationships. That is, a predicted frame (ether P-frame or B-frame in the MPEG-2 examples) must be accompanied by the necessary anchor frames (I or P frames used to predict the inter-frame coded picture).

FIG. 16A illustrates exemplary alternative advertisements made up of only I-frames. A first exemplary alternative advertisement 1620 is a single I frame for the entire time it takes to fast forward through the advertisement. As illustrated, frame 1606 was selected to display. A second exemplary alternative advertisement 1630 is several contiguous and sequential I-frames being displayed. As illustrated, the 2$^{nd}$ I-frame (7$^{th}$ frame) 1604, the 3$^{rd}$ I frame (13$^{th}$ frame) 1606, and the 4$^{th}$ I-frame (19$^{th}$ frame) 1608 are displayed one after another. A third exemplary alternative advertisement 1640 is several sequential I-frames being displayed. As illustrated, the 1$^{st}$ I-frame (1$^{st}$ frame) 1602, and the 5$^{th}$ I-frame (25$^{th}$ frame) 1610 are displayed one after another. A fourth exemplary alternative advertisement 1650 is several I-frames being displayed out of sequence. As illustrated, the 3$^{rd}$ I-frame (13$^{th}$ frame) 1606, the first I-frame (1$^{st}$ frame) 1602, and the 5$^{th}$ I-frame (25$^{th}$ frame) 1610 are displayed one after another. As one skilled in the art would recognize, there are numerous combinations of displaying single images one after another that would be well within the scope of the current invention.

FIG. 16B illustrates exemplary alternative advertisements made up of segments of video from the original advertisement 1600. A first exemplary alternative advertisement 1660 is a single segment of video extracted unedited from the advertisement 1600. As illustrated, the video from the 3$^{rd}$ I-frame 1606 through the fourth I-frame 1608 and continuing to the 1$^{st}$ P-frame thereafter makes up the alternative advertisement 1660. A second exemplary alternative advertisement 1670 is a single segment of video that is edited from the form of the advertisement 1600. As illustrated, the third I-frame 1606 is displayed followed by only limited B-frames thereafter, followed by the fourth I-frame 1608 and a majority of the B-frames and P-frames thereafter, followed by the fifth I-frame 1610. In this embodiment, the segment of video was similar to the unedited version 1660, except certain B-frames and P-frames were removed and additional video was displayed (I-frame 1610). A third exemplary alternative advertisement 1680 is several segments of video combined together (edited or unedited, in order or out of order). As illustrated, the entire video between I-frame 1606 and I frame 1608, is followed by an edited version of the video from I-frame 1602 to I-frame 1604. As one skilled in the art would recognize, there are numerous combinations of displaying segments of video that would be well within the scope of the current invention.

Figure 16C:
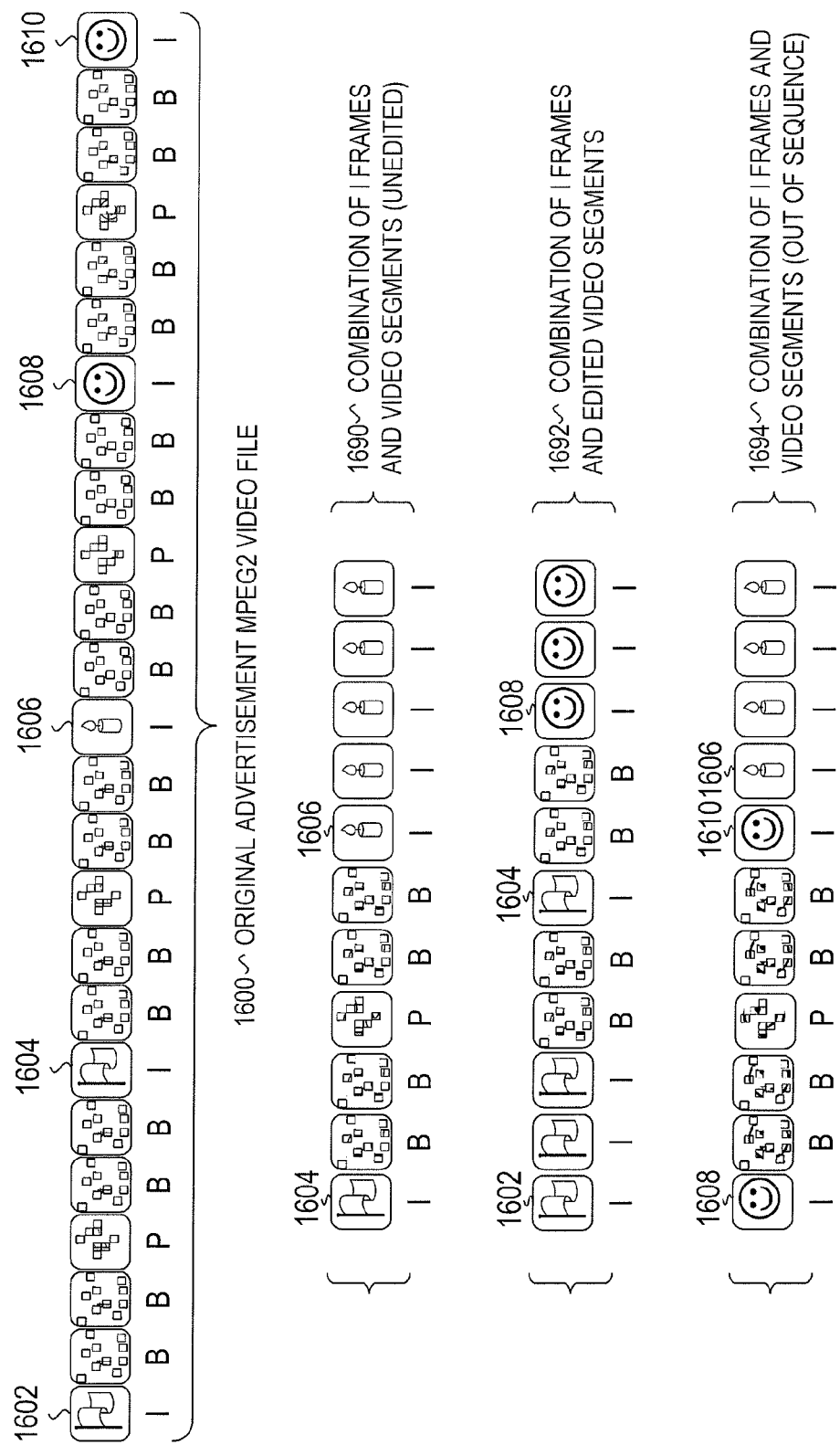

FIG. 16C illustrates exemplary alternative advertisements made up of a combination of segments of video and I-frames from the original advertisement 1600. A first exemplary alternative advertisement 1690 is a combination of a segment of unedited video and an I-frame. As illustrated, the video from I-frame 1604 to I-frame 1606 is followed by the repetition of I-frame 1606. A second exemplary alternative advertisement 1692 is a combination of segments of edited video and I-frames. As illustrated, I-frame 1602 is repeated, followed by edited video from I-frame 1602 through I-frame 1604 and beyond, followed by repetition of I-frame 1608. A third exemplary alternative advertisement 1694 is a combination of segments of video and I-frames out of sequence. As illustrated, the video from I-frame 1608 to I-frame 1610 is followed by the repetition of I-frame 1606. As one skilled in the art would recognize, there are numerous iterations of displaying segments of video in combination with I-frames that would be well within the scope of the current invention.

As previously mentioned, it is also possible that the processing rules associated (specifically those related to the advertisements) could also edit the advertisement by adding computer generated graphics, cropping the advertisement, adjusting video features (i.e., color, opacity), and other editing features that would be obvious to one skilled in the art. Examples of alternative ads that could be created using editing features include, but are not limited to:

Cropping an I-frame or video segment (i.e., just using the potion of an I-frame with the actors face, or the product);

Adding text (not in the original ad) to an I-frame or video segment;

Adjusting the coloring of the advertisement so that an I-frame could be used as a background (i.e., logo) with a video segment running in front of it;

fading in and out between frames or segments; and emphasizing certain features in a frame or video segment.

As one of ordinary skill in the art would recognize, the number of ways to modify an advertisement in order to create an alternative ad is almost limitless. The current invention is in no way intended to be limited to the above examples but should be construed to include all plausible variations and iterations thereof.

The processing rules associated with audio are likely not as complex as there are not as many ways for splicing audio together that would be audible. The processing rules for audio may include playing a single portion of the audio (i.e., first two seconds) or splicing several portions of audio together (i.e., first second and last second). According to one embodiment, the appropriate segment of video is identified in some manner, such as with metadata, and the identified segment is played. According to another embodiment, a portion of background music from the ad may be played while the words of the ad are extracted (not played). According to another embodiment of the invention, audio associated with either more or less time that the length of the alternative ad are selected and then slowed down or speed up accordingly. For example, it is possible that the first three seconds of audio (i.e., details about a sale) are speed up so they are played back within two seconds. As one skilled in the art, would recognize modifying the audio in such a fashion would effect the pitch of the audio. Thus, according to one embodiment, after the audio was either speed up or slowed down the pitch of the audio would be adjusted prior to playback. As one of ordinary skill in the art would recognize there are other processing rules that could be used to select and/or edit audio for the alternative ads that would be well within the scope of the current invention.

Figure 17:
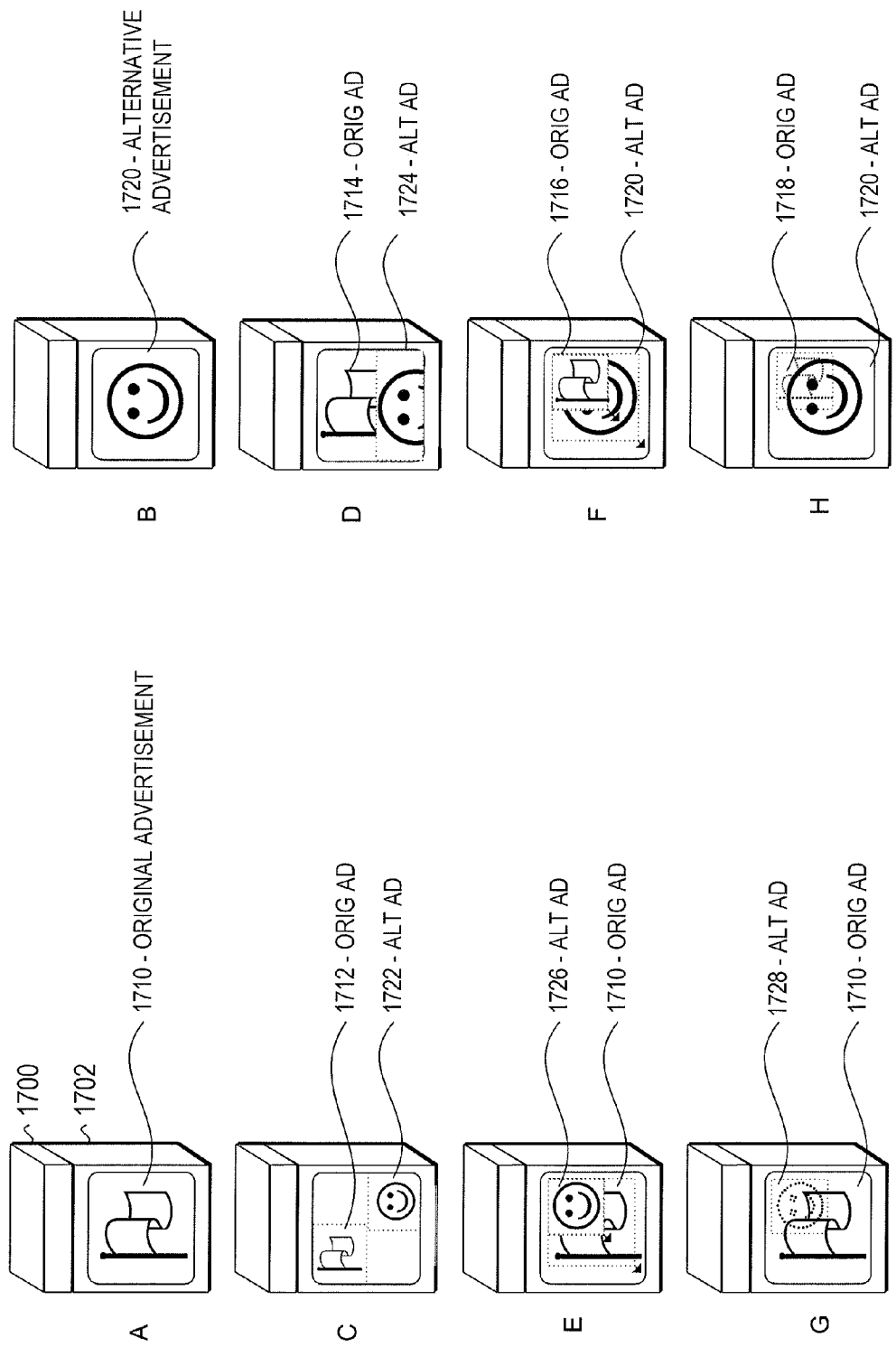
FIG. 17 illustrates exemplary embodiments for placement of the alternative advertisement.

Once the alternative ad (whether generated or received as a separate file) is selected for display during a trick-play event, the alternative ad is displayed to the subscriber. As previously discussed, the alternative ad may be displayed in place of the ad or in conjunction with the ad. FIG. 17 illustrates various embodiments of how the alternative ad can be displayed to the subscriber. Each embodiment illustrates a STB PVR 1700 and a TV 1702, though one skilled in the art would realize that the PVR 1700 could be a HE PVR, a DVD player or other devices that can play back recorded programs. The first embodiment (A), illustrates the original advertisement 1710 being displayed in trick play mode (i.e., fast forward, skip, rewind). The second embodiment (B), illustrates the alternative advertisement 1720 being displayed in place of the original advertisement. As previously discussed, the alternative advertisement may be a still image or a video, may have been generated from the original advertisement or may have been received as a separate file, and may include audio or not.

The remaining embodiments, illustrate the alternative ad being placed in conjunction with the original advertisement in trick play mode (i.e., fast forward). These embodiments are preferable as the subscriber can see the original ad and see that they are actually skipping portions of the ad and are not being forced to watch additional ads. The third embodiment (C), illustrates a split screen with the original ad 1712 on one half and the alternative ad 1722 on the other half. As illustrated, each ad is reduced in size from embodiments A and B so that the entire ad (original and alternative) fits on the appropriate half of the screen. The fourth embodiment (D), also illustrates a split screen with the original ad 1714 on one half and the alternative ad 1724 on the other half. However, in this embodiment each ad is cropped from that illustrated in embodiments A and B. It should be noted that the cropped alternative ad 1722 may in fact be a cropped version of an image or video segment from the original ad and not actually a cropped version of the alternative ad.

The fifth embodiment (E), illustrates the alternative ad 1726 superimposed over the original ad 1710. The superimposition is shown as the upper right corner, but it is not limited thereby. In fact according to one embodiment, the location, size and shape of the superimposed ad 1726 are adjustable. The adjustments may be defined in the processing rules (i.e., by the advertiser) or may be made by the network operator. In either event, the adjustments may be based on who is watching the ad. In an alternative embodiment, the subscriber may make the adjustments (the subscriber may make the adjustments each time or may define his preferences and have those preferences as the default orientation). The sixth embodiment (F), illustrates the original ad 1716 superimposed over the alternative ad 1720. As with the fifth embodiment (E), the size, shape and location of the superimposed ad are adjustable.

The seventh embodiment (G), illustrates the alternative ad 1728 superimposed over the original ad 1710. The superimposition is illustrated as having different video features than the original ad 1710. For example, the superimposed ad may have a degree of opaqueness so that portions of the original ad 1710 can be seen below. Other video features can include modifying the color, contrast, brightness, hue, tint and saturation, but are not limited thereby. As illustrated, the superimposed ad 1728 has less distinct features and accordingly the original ad 1710 has the more distinct features (i.e., color, brightness reduced on superimposed ad 1728). However, this embodiment is not limited thereto. In fact, the video features of the superimposed ad 1728 could be adjusted to make the superimposed ad 1728 more distinct. In another embodiment, the video features of the original ad 1710 could be adjusted to either make the original ad 1710 more distinct (bright) or more subtle (dull). In another embodiment, the video features of both ads could be adjusted. The adjustments may be defined in the processing rules (possibly dependent on who is watching the ad), by the network operator, or by the subscriber. The eighth embodiment (F), illustrates the original ad 1718 superimposed over the alternative ad 1720. As with the seventh embodiment (G), the video features of either ad may be adjusted.

As one skilled in the art would recognize there are numerous alternatives for displaying alternative ads or alternative ads in conjunction with the original ads that are not described above but that would be well within the scope of the current invention. For example, whichever ad is superimposed on the other could be surrounded by a border to help distinguish between the two.

According to one embodiment of the present invention it is possible to generate a single alternative advertisement for multiple advertisements. According to one embodiment, an advertiser may have two advertisements slated to be played on after one another and may wish to present, for example, a single 4-second alternative ad as opposed to two 2-second alternative ads. As discussed above, the alternative ad may be received as a separate file or may be generated by applying the processing rules to the advertisements. However, the ads need not be for the same advertiser in order to be combined. For example, two advertisers who have complimentary products may wish to define a combined alternative advertisement (i.e., Coke and McDonalds may have a combined alternative ad). As would be obvious to one of ordinary skill in the art, coordination between the advertiser(s) would be required.

In yet another alternative embodiment, it is possible that during fast-forwarding of two advertisements (i.e., one for company A and one for company B) a combined alternative ad (for company C not related to companies A and B) is displayed (i.e., a 4-second alternative ad for Tylenol is displayed while advertisements for Burger King and Budweiser are fast forwarded). As would be obvious to one of ordinary skill in the art, in a preferred embodiment, the unrelated alternative ad would be a separate file. However, it is possible that the unrelated alternative ad could be generated from the ads (though there may be some copyright issues with that). The unrelated alternative advertisement may have been linked to the advertisements for some reason (i.e., an alternative Beer ad during fast forwarding of a football and truck ad). The linking may be done by the advertiser prior to transmitting the alternative ad (i.e., the unrelated ad is sent with a link to the ad) or may be done within the PVR (i.e., display this alternative ad if an certain ad or set of ads is fast forwarded through and does not already have an alternative ad(s) defined therefore). Alternatively, the alternative ad may simply been the next alternative advertisement to display during a trick play event of two ads.

It should be noted that the display of unrelated ads is discussed above in relation to a combined alternative ad for two advertisements. However, these same methods could be applied to a single ad or more than two consecutive ads.

According to one embodiment of the invention, the PVR determines the location with the advertisement when the trick play event (i.e., fast forward) is initiated, and if applicable the speed of the trick play event. If a determination is made that the ad has progressed to far, or that the speed is too great, or some combination thereof, the PVR may either prevent the trick-play event or skip the alternative ad. In another embodiment, the alternative ad will be initiated and the trick play event will be paused for the time it takes to complete the alternative advertisement.

As one of ordinary skill in the art would recognize, and as discussed above, some PVRs have a skip advertisement function. According to one embodiment of the invention, the playback of the recorded video after the skip command would be paused while an alternative ad was displayed. In another embodiment, if the trick play event is a pause, the PVR may display an alternative ad after a predetermined amount of time expired. The reason for the delayed time is that the subscriber may have paused on the ad for a reason, such as to obtain a phone number, or they may have left the room. An alternative ad displayed during a pause event is likely displayed in conjunction with the original ad. Moreover, it is likely that the subscriber would be able to delete or withdraw the alternative advertisement before any certain time has passed (i.e., if the subscriber had stopped to view a phone number on the original ad). As it is possible that a pause lasts for a while, it is possible that the alternative ad is displayed for a long time or that multiple alternative ads are displayed (if available). According to one embodiment, the alternative ads may not be related to the paused ad.

During the playback of an advertisement, the subscriber may change channels to live television for the approximate amount of time that the ad would run (i.e., 30 seconds, or possibly 2 minutes for the entire commercial break). According to one embodiment, an alternative ad will be displayed in conjunction with the live programming. According to another embodiment, the alternative ad will be displayed for the time it takes the channel change to occur (as one skilled in the art knows the changing of channels in digital cable, satellite and SDV systems may take several seconds).

The invention has been described with specific emphasis on digital video. However, the invention is not limited thereto and may be applied to audio, streaming media and other advertisement media that would be known to those skilled in the art. In fact, this application has defined some alternative audio advertisements as they relate to the video counterparts but could applied to simply audio. Moreover, this application has concentrated on PVRs but the invention is not limited thereto. In fact the invention to be applied to any prerecorded media. For example, if a subscriber attempted to fast forward through the previews on a movie rental they may be presented with an alternative preview.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer-implemented method for displaying alternate advertising comprising:
    receiving a video for playback by a personal video recorder (PVR), the video including programming content, at least one primary advertisement and at least one alternate advertisement;
    detecting a trick play command by the PVR, during display of the at least one primary advertisement;
    identifying by the PVR, which trick play command has been detected;
    modifying by the PVR, one or more of a format and a play time, of the at least one alternate advertisement to correspond to the identified trick play command; and
    displaying by the PVR, the at least one adjusted alternate advertisement corresponding to the identified trick play command during execution of the trick play command.

2. The computer-implemented method of claim 1, wherein the modifying by the PVR includes insertion and splicing.

3. The computer-implemented method of claim 1, wherein when the detected trick play command is identified as a pause command, the modifying by the PVR includes formatting the alternate advertisement as a still image.

4. The computer-implemented method of claim 1, wherein when the detected trick play command is identified as a skip command, the modifying by the PVR includes formatting the alternate advertisement as a still image.

5. The computer-implemented method of claim 1, further comprising:
determining by the PVR, an execution time length for completion of the detected trick play command when the detected trick play command is identified as a fast forward command.

6. The computer-implemented method of claim 5, wherein the modifying by the PVR includes modifying the at least one alternate advertisement to have a play time length equal to the determined execution time length of the fast forward command.

7. The computer-implemented method of claim 1, further comprising:
determining by the PVR, an execution time length for completion of the detected trick play command when the detected trick play command is identified as a rewind command.

8. The computer-implemented method of claim 7, wherein the modifying by the PVR includes modifying the at least one alternate advertisement to have a play time length equal to the determined execution time length of the rewind command.

9. The computer-implemented method of claim 1, wherein the at least one alternate advertisement is related to a content of the at least one primary advertisement.

10. The computer-implemented method of claim 1, wherein the at least one alternate advertisement is not related to a content of the at least one primary advertisement.

11. A system for delivering alternate advertising to a user, the system comprising:
a video playback component suitable for displaying video to the user, the video including programming content, at least one primary advertisement and at least one alternate advertisement; and
a processing component suitable for:
detecting a trick play during display of the at least one primary advertisement;
identifying which trick play command has been detected;
modifying one or more of a format and a play time of the at least one alternate advertisement to correspond to the identified trick play command; and
displaying the at least one adjusted alternate advertisement corresponding to the identified trick play command during execution of the trick play command.

12. The system of claim 11, wherein the modifying includes insertion and splicing.

13. The system of claim 11, wherein when the detected trick play command is identified as a pause command, the modifying includes formatting the alternate advertisement as a still image.

14. The system of claim 11, wherein when the detected trick play command is identified as a skip command, the modifying includes formatting the alternate advertisement as a still image.

15. The system of claim 11, further comprising:
determining an execution time length for completion of the detected trick play command when the detected trick play command is identified as a fast forward command.

16. The system of claim 15, wherein the modifying includes modifying the at least one alternate advertisement to have a play time length equal to the determined execution time length of the fast forward command.

17. The system of claim 11, further comprising:
determining an execution time length for completion of the detected trick play command when the detected trick play command is identified as a rewind command.

18. The system of claim 17, wherein the modifying includes modifying the at least one alternate advertisement to have a play time length equal to the determined execution time length of the rewind command.

19. The system of claim 11, wherein the at least one alternate advertisement is related to a content of the at least one primary advertisement.

20. The system of claim 11, wherein the at least one alternate advertisement is not related to a content of the at least one primary advertisement.

* * * * *